US006889526B2

(12) United States Patent
Pitbladdo

(10) Patent No.: US 6,889,526 B2
(45) Date of Patent: May 10, 2005

(54) OVERFLOW DOWNDRAWN GLASS FORMING METHOD AND APPARATUS

(76) Inventor: Richard B. Pitbladdo, 6949 Bentgrass Dr., Naples, FL (US) 34113

( * ) Notice: Subject to any disclaimer, the term of this patent is extended or adjusted under 35 U.S.C. 154(b) by 319 days.

(21) Appl. No.: 10/214,904

(22) Filed: Aug. 8, 2002

(65) Prior Publication Data

US 2003/0029199 A1 Feb. 13, 2003

Related U.S. Application Data

(60) Provisional application No. 60/310,989, filed on Aug. 8, 2001, provisional application No. 60/316,676, filed on Aug. 31, 2001, provisional application No. 60/318,726, filed on Sep. 12, 2001, provisional application No. 60/318,808, filed on Sep. 13, 2001, provisional application No. 60/345,464, filed on Jan. 3, 2002, and provisional application No. 60/345,465, filed on Jan. 3, 2002.

(51) Int. Cl.[7] .............................................. C03B 17/06
(52) U.S. Cl. ................................ 65/53; 65/121; 65/195
(58) Field of Search ............................ 65/53, 121, 195

(56) References Cited

U.S. PATENT DOCUMENTS

| 1,759,229 A | 2/1928 | Drake |
| 1,673,907 A | 6/1928 | Ferngren |
| 1,697,227 A | 1/1929 | Danner |

(Continued)

FOREIGN PATENT DOCUMENTS

| DE | 1596484 | 7/1967 |
| DE | 1596402 | 12/1967 |
| DE | 1596403 | 12/1967 |

(Continued)

OTHER PUBLICATIONS

Bottger, et al.; "LCD substrate—the future process" International Glass Review, Issue 2—2000; 3 pages.

Bocko, Peter L. and Mitchell, Mark H. "AMLCD Glass Substrates—Foundation for High–Tech Displays" The GlassReseacher, vol. 12, No. 1, pp. 26–29, 2002, no month available.

Varshneya, Arun, "Fundamentals of Inorganic Glasses", Academic Press, Inc., 1994, pp. 534–540.

Snyder, R.D./Byars, E.F., "Engineering Mechanics", McGraw–Hill Book Company, 1973, pp. 349–350.

Kingery, W.D.; Bowen, H.K.; Uhlmann, D.R., "Introduction to Ceramics", John Wiley & Sons, 1976, pp. 705–767.

Primary Examiner—Sean Vincent
(74) Attorney, Agent, or Firm—Brown & Michaels, PC

(57) ABSTRACT

One embodiment of the present invention is an improved sheet glass forming apparatus. In another embodiment, a precise thermal control system redistributes the flow of molten glass at the weirs to counteract the degradation of the sheet forming apparatus which inevitably occurs during manufacturing. In yet another embodiment, the invention introduces a counteracting force to the stresses on the trough in a manner such that the thermal creep which inevitably occurs has a minimum impact on the glass flow characteristics of the forming trough. Another embodiment creates a variable external cross-section which provides hydraulic stresses that are in opposition to the surface tension and body force stresses and thus, reduces the influence of surface tension and body forces. In an alternative embodiment, the glass is preferentially cooled across its width to create forming stresses during solidification, which ensures that the glass sheet drawn is inherently flat. In an additional embodiment, the internal pressure is adjusted in each of the major components of the forming apparatus such that the pressure difference across any leakage path to the forming zone is essentially zero. Therefore, air leakage in the apparatus is minimized even though the cracks and openings exist during initial operation and develop during manufacturing.

81 Claims, 32 Drawing Sheets

U.S. PATENT DOCUMENTS

| | | | |
|---|---|---|---|
| 1,731,260 A | 10/1929 | Nobbe | |
| 1,829,639 A | 10/1931 | Ferngren | |
| 1,829,641 A | 10/1931 | Ferngren | |
| 1,841,579 A | 1/1932 | Fraser | |
| 1,891,370 A | 12/1932 | Danner | |
| 3,149,949 A | 9/1964 | Dockerty et al. | 65/53 |
| 3,338,696 A | 8/1967 | Dockerty | 65/145 |
| 3,433,613 A | 3/1969 | Dockerty | 65/145 |
| 3,437,470 A | 4/1969 | Overman | 65/195 |
| 3,451,798 A | 6/1969 | Simon | 65/199 |
| 3,506,429 A | 4/1970 | Overman | 65/203 |
| 3,519,411 A | 7/1970 | Cortright et al. | 65/90 |
| 3,589,887 A | 6/1971 | Ward | 65/195 |
| 3,607,182 A | 9/1971 | Leibowitz | 65/53 |
| 3,682,609 A | 8/1972 | Dockerty | 65/83 |
| 3,723,082 A | 3/1973 | Knowles et al. | 65/84 |
| 4,214,886 A | 7/1980 | Shay et al. | 62/121 |
| 4,416,678 A | 11/1983 | Bottger | 65/2 |
| 5,374,595 A | 12/1994 | Dumbaugh, Jr. et al. | 501/66 |
| 6,319,867 B1 | 11/2001 | Chacon et al. | 501/66 |
| 2001/0039814 A1 | 11/2001 | Pitbladdo | 65/193 |
| 2003/0110804 A1 | 6/2003 | Fenn et al. | 65/90 |
| 2003/0192349 A1 | 10/2003 | Meda et al. | 65/53 |
| 2004/0055338 A1 * | 3/2004 | Helfinstine et al. | 65/374.13 |

FOREIGN PATENT DOCUMENTS

| | | |
|---|---|---|
| DE | 21 58 253 | 11/1971 |
| DE | 31 11484 A1 | 2/1983 |
| DE | 33 16795 | 11/1983 |
| DE | 31 11484 C2 | 12/1983 |
| DE | 33 14540 | 12/1983 |
| DE | 3329843 | 5/1984 |
| DE | 3507852 | 8/1985 |
| DE | 3518137 | 1/1986 |
| DE | 43 36 046 | 10/1993 |
| DE | 43 26 143 | 12/1993 |
| DE | 196 44 673 | 4/1998 |
| DE | 198 09 878 | 9/1999 |
| DE | 198 40 113 | 3/2000 |
| DE | 19964043 | 7/2001 |
| DE | 100 21 013 | 11/2001 |
| DE | 100 28 741 | 12/2001 |
| FR | 1549081 | 12/1967 |
| FR | 1549915 | 1/1968 |
| GB | 982153 | 2/1965 |
| JP | 09110443 | 4/1997 |
| JP | 10291827 | 11/1998 |
| JP | 11-246230 | 9/1999 |
| JP | 2001-80922 | 9/1999 |

* cited by examiner

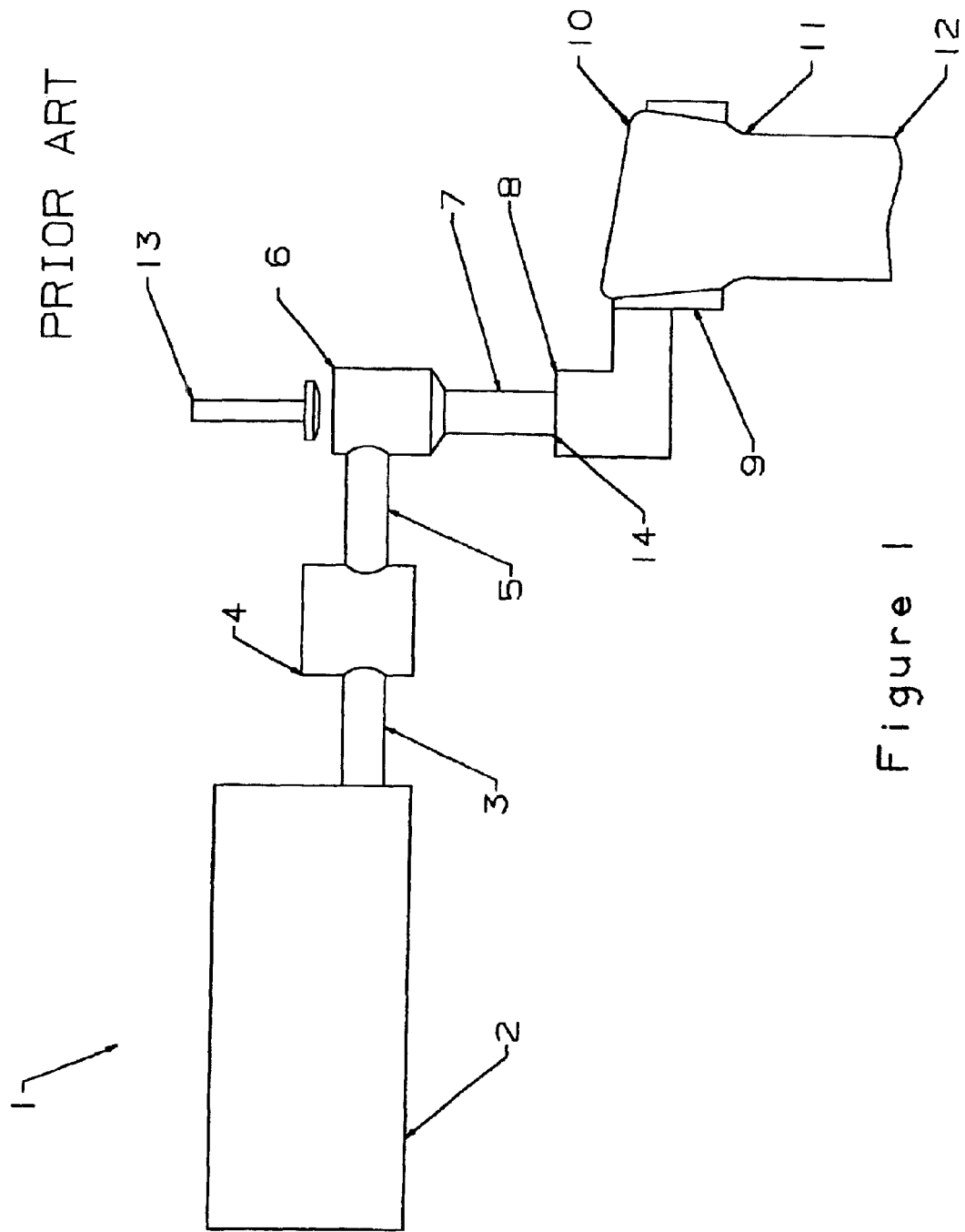

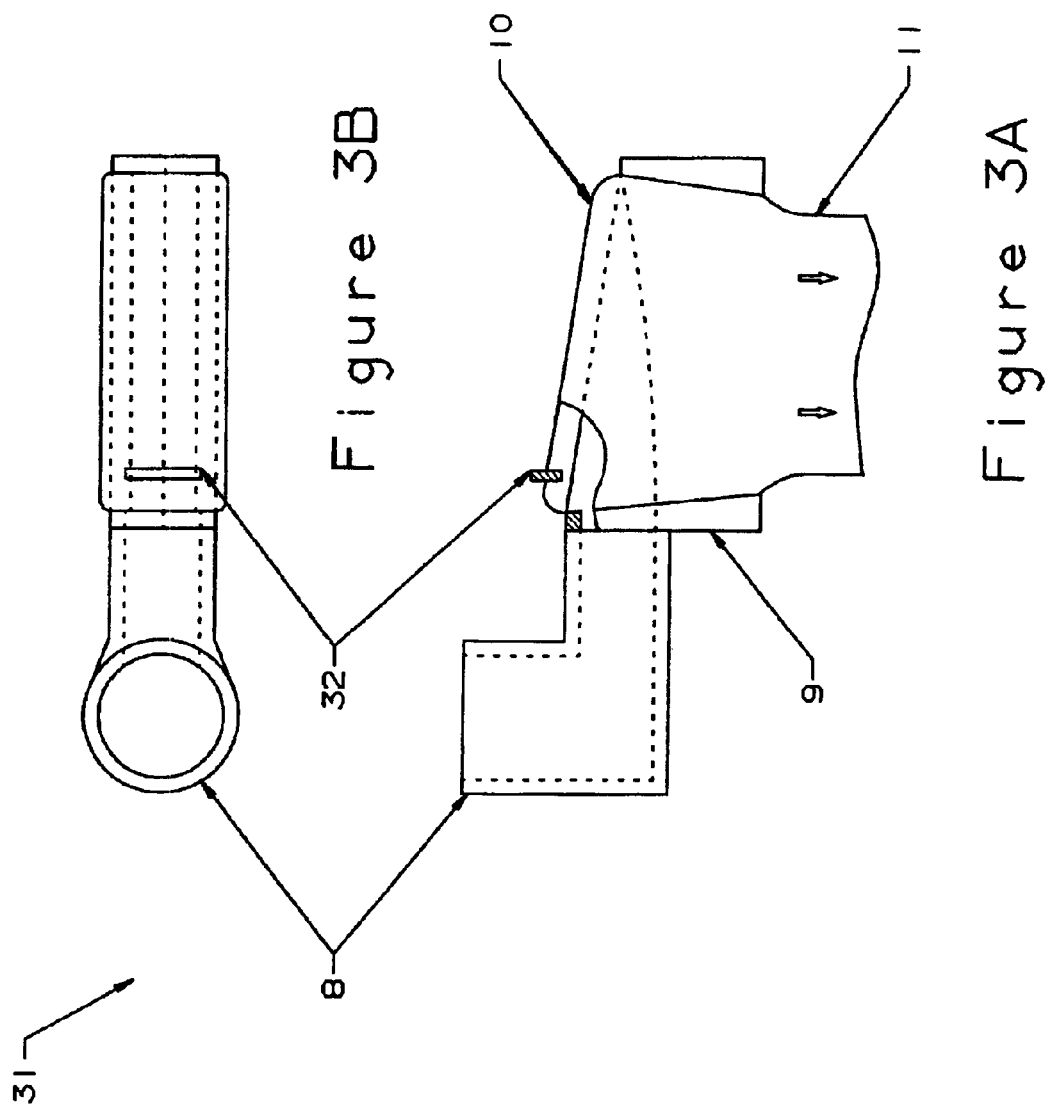

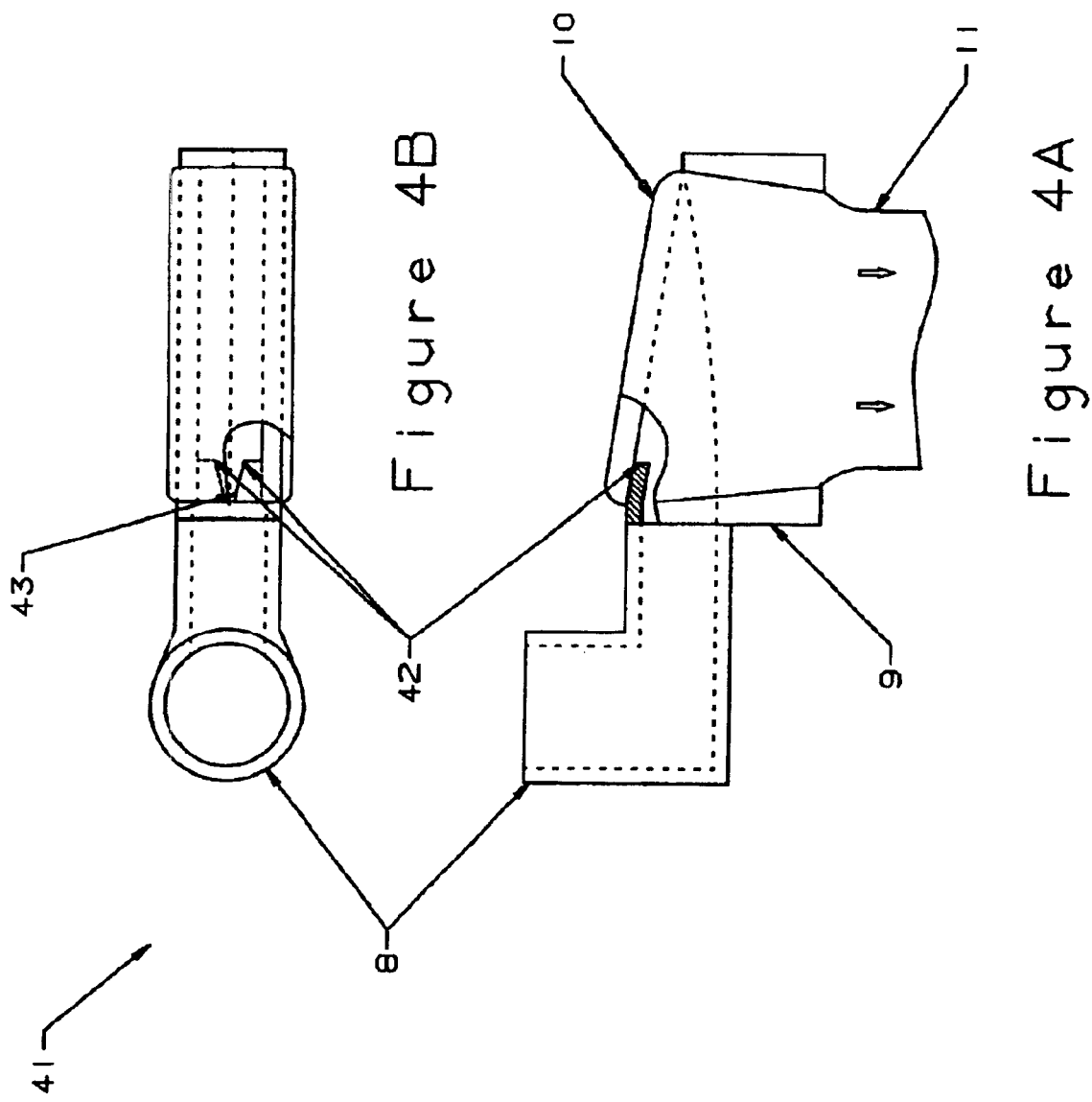

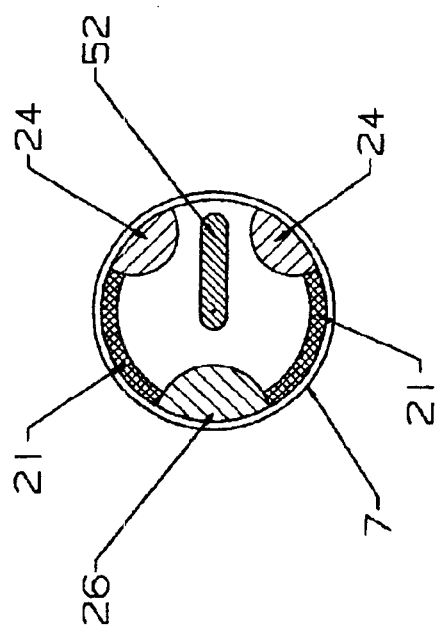
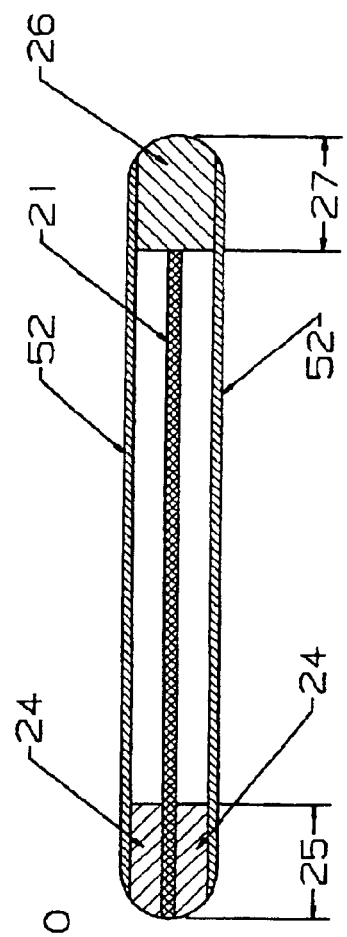
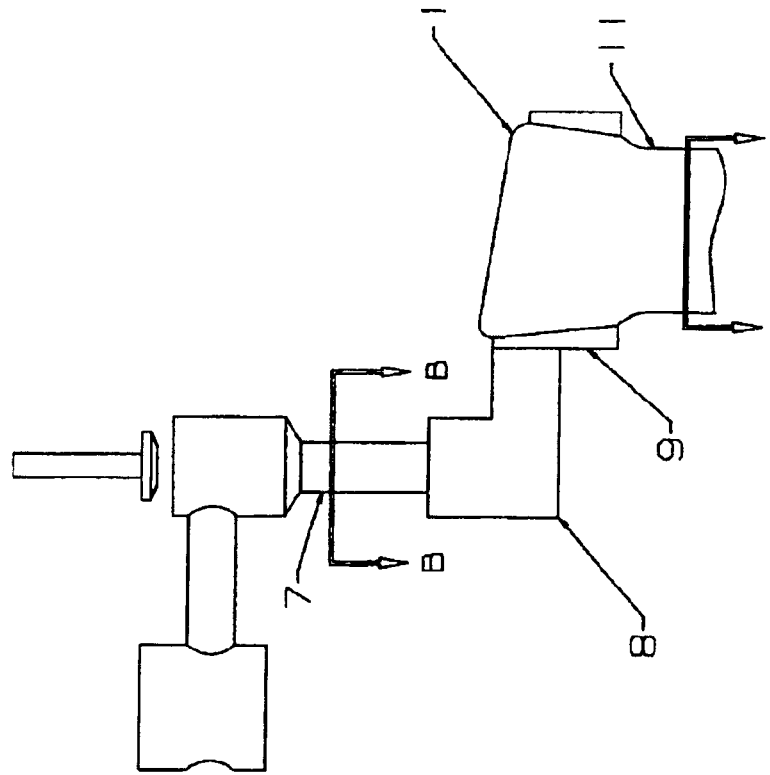
Figure 5B
Figure 5C
Figure 5A

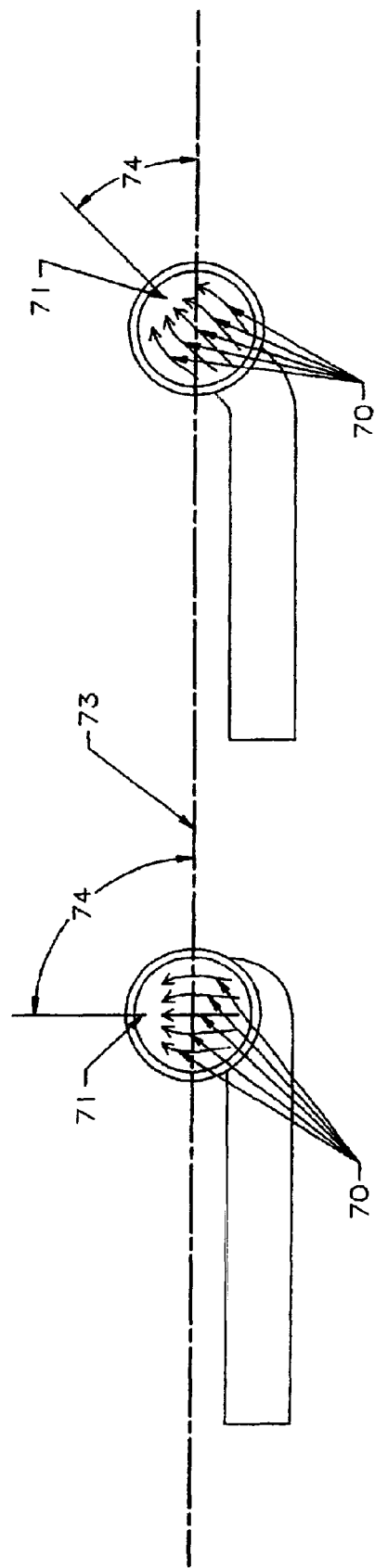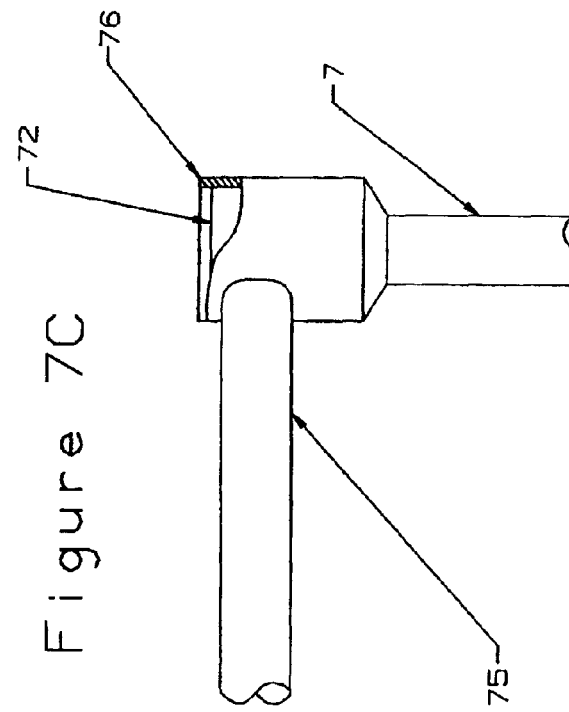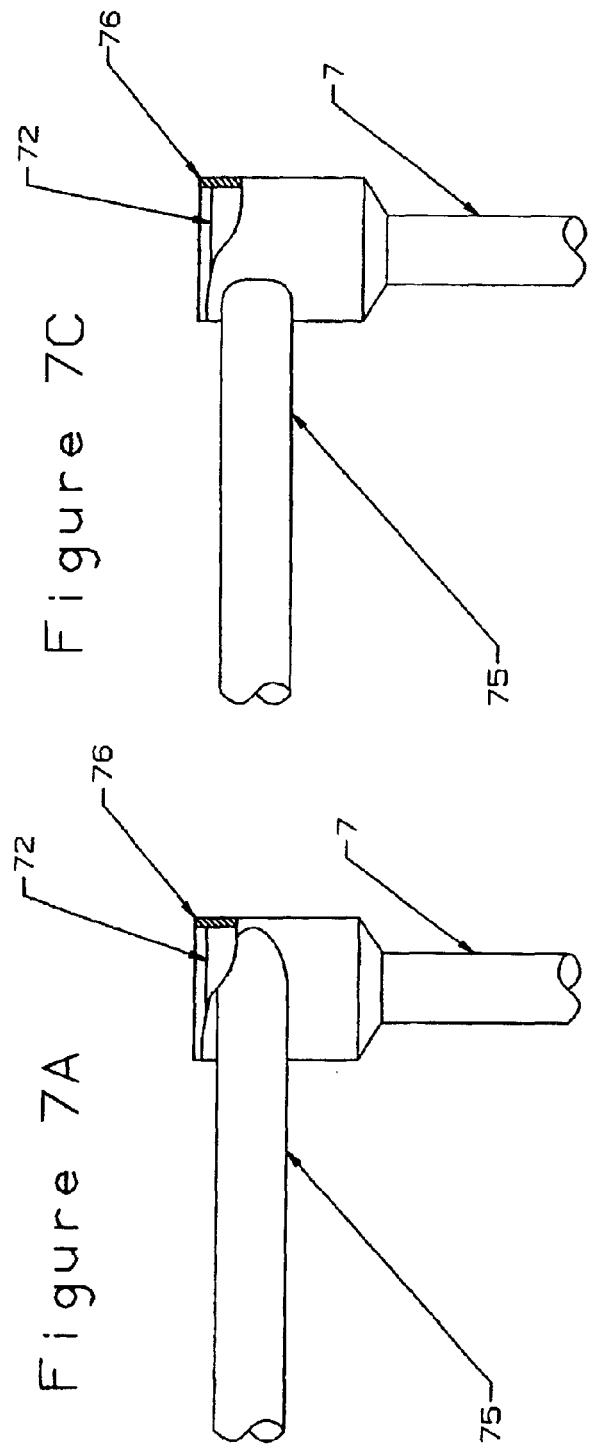
Figure 7C
Figure 7D
Figure 7A
Figure 7B

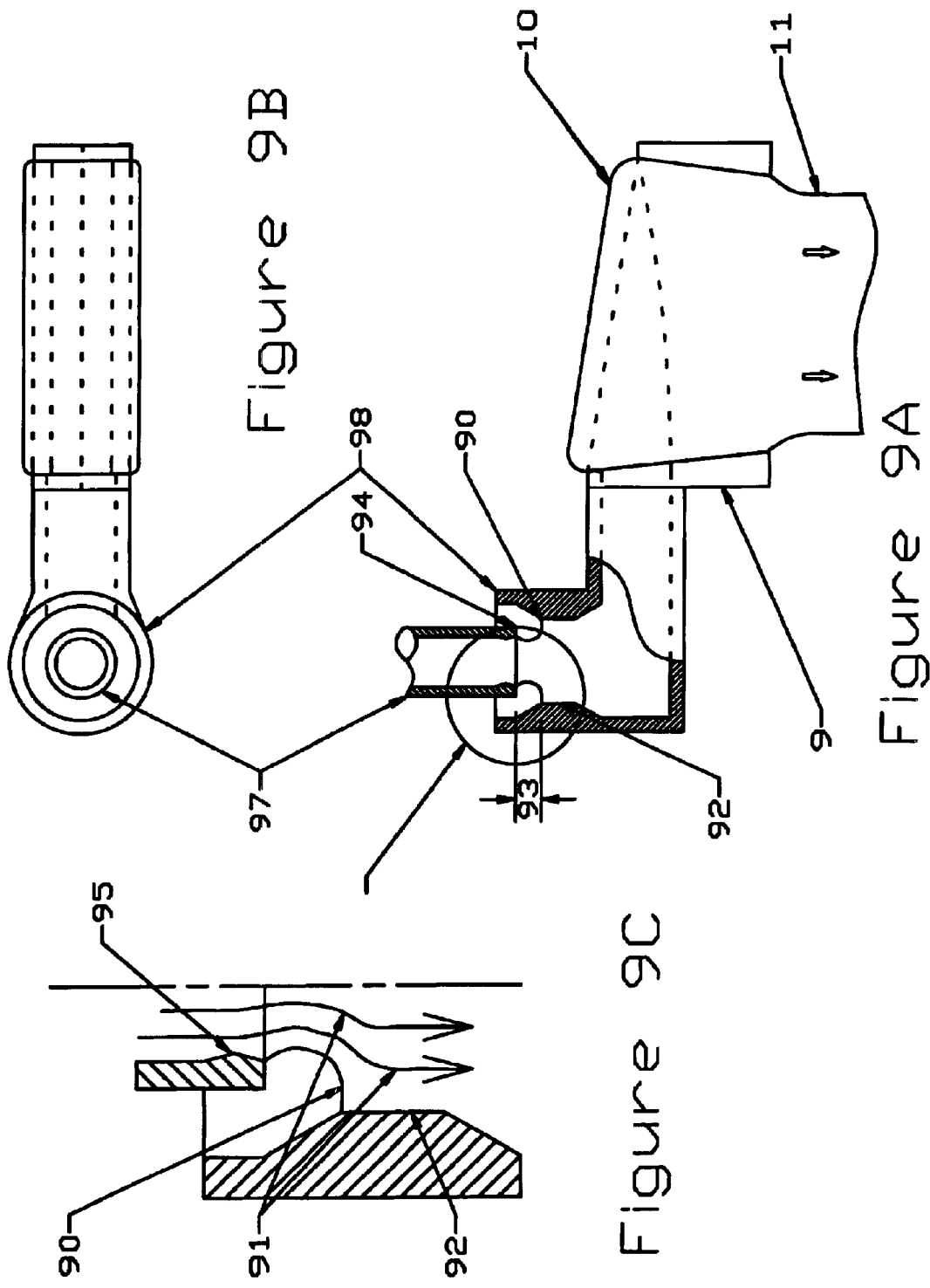

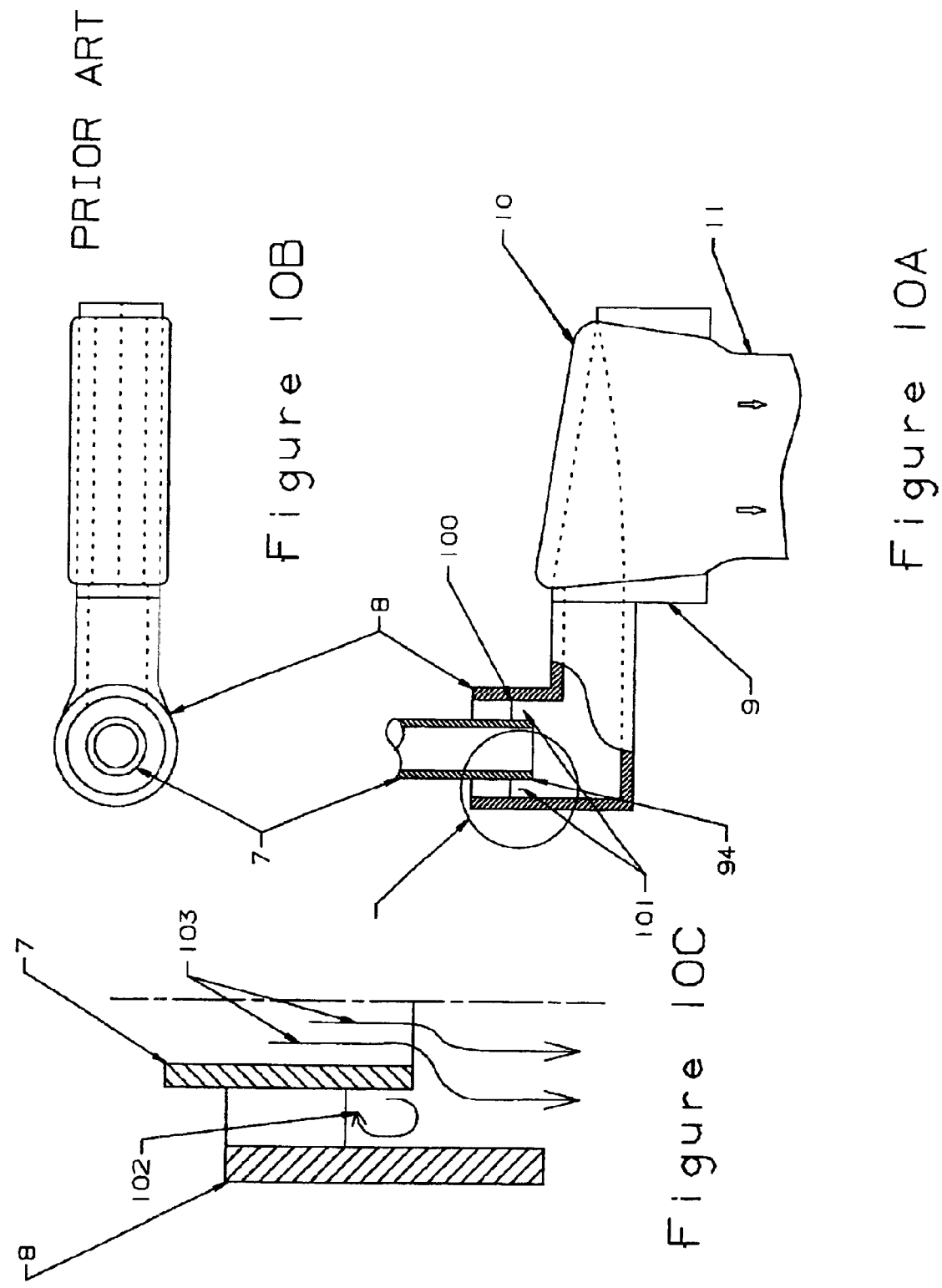

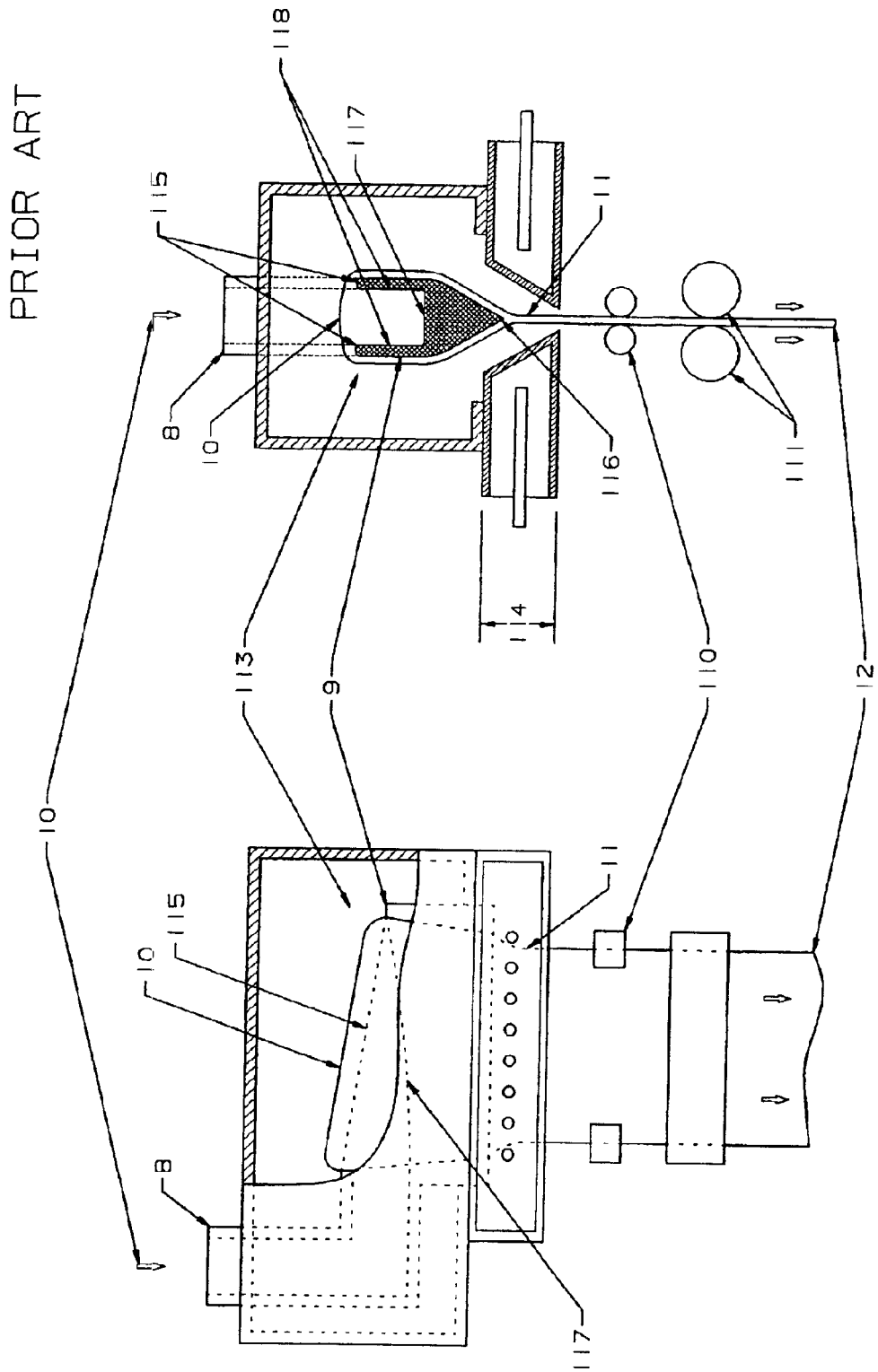

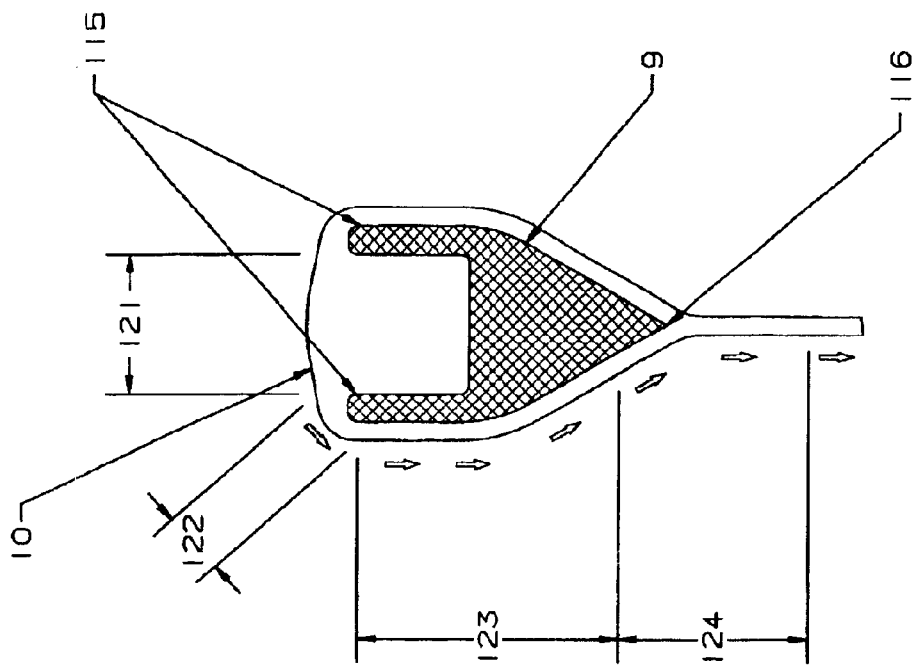
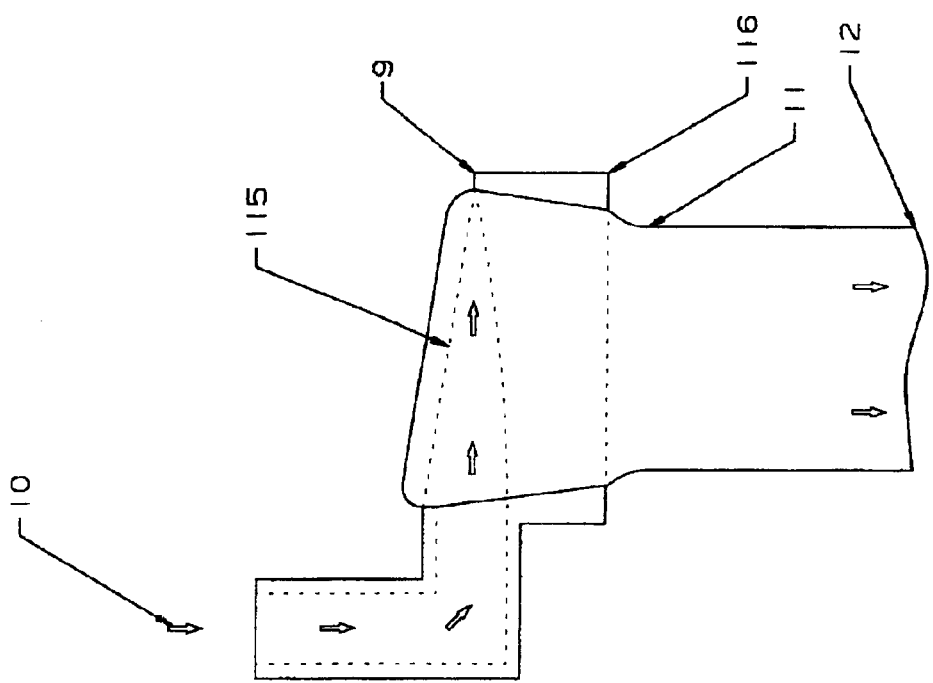
Figure 12B
Figure 12A

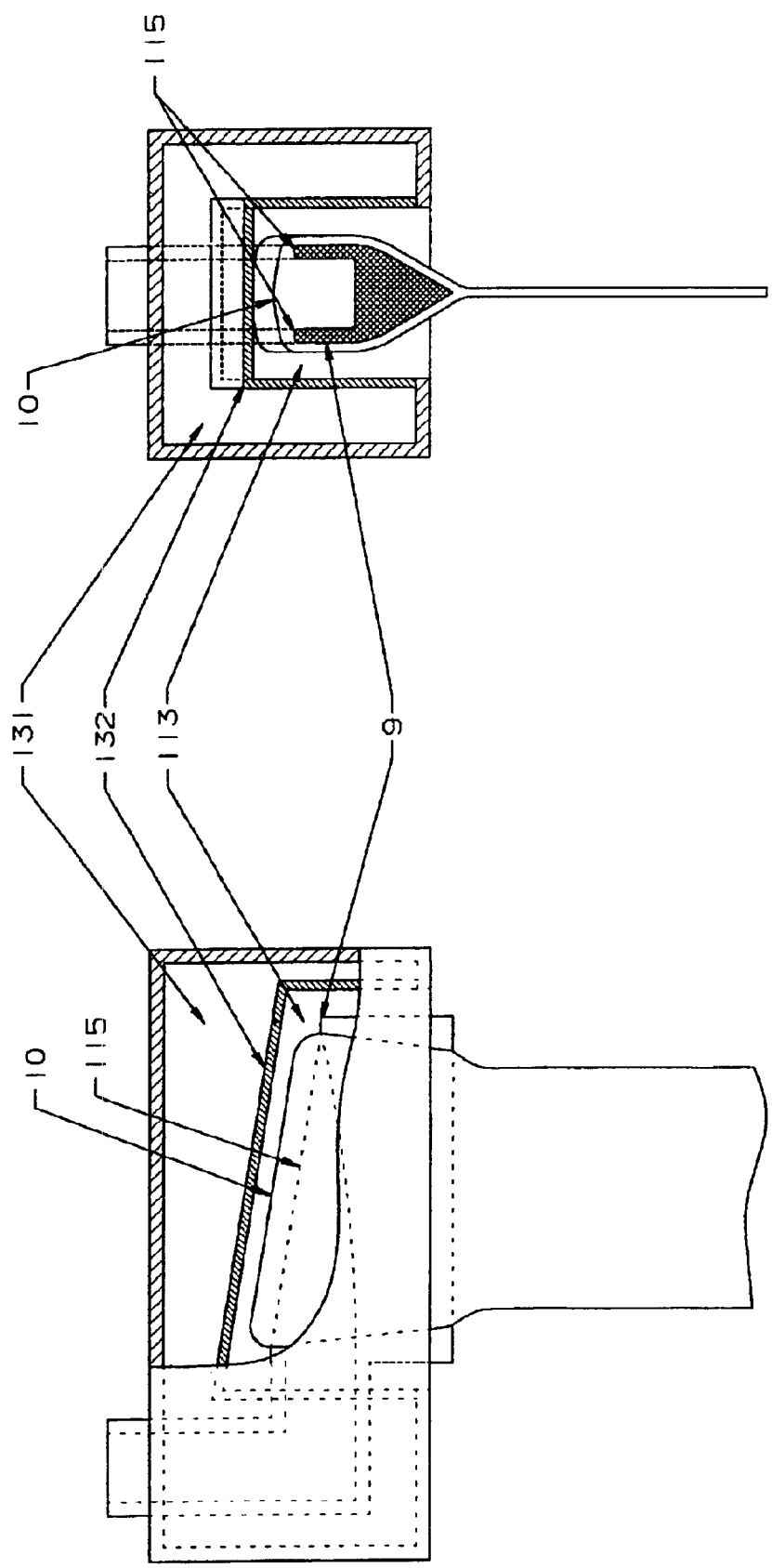

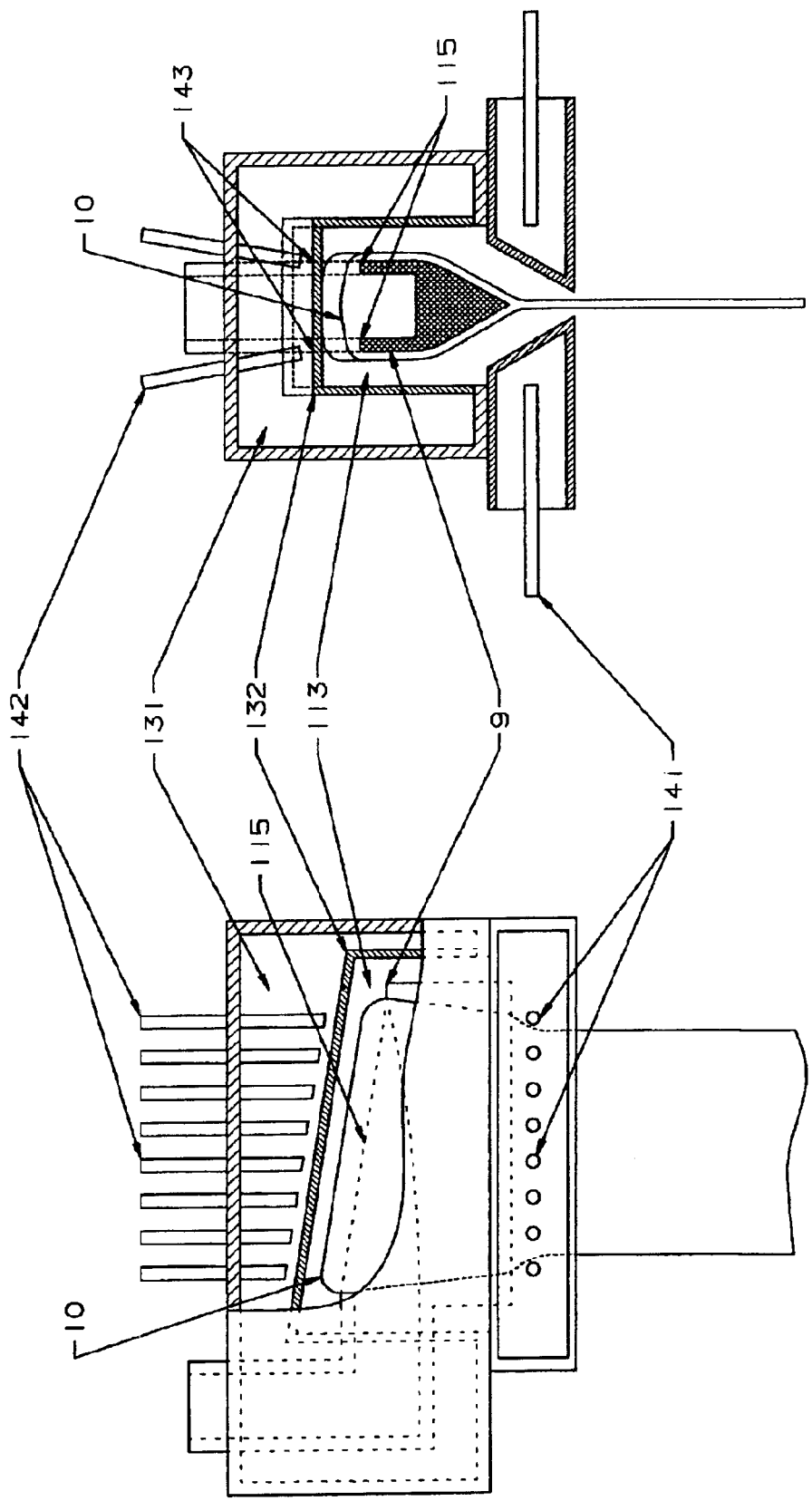

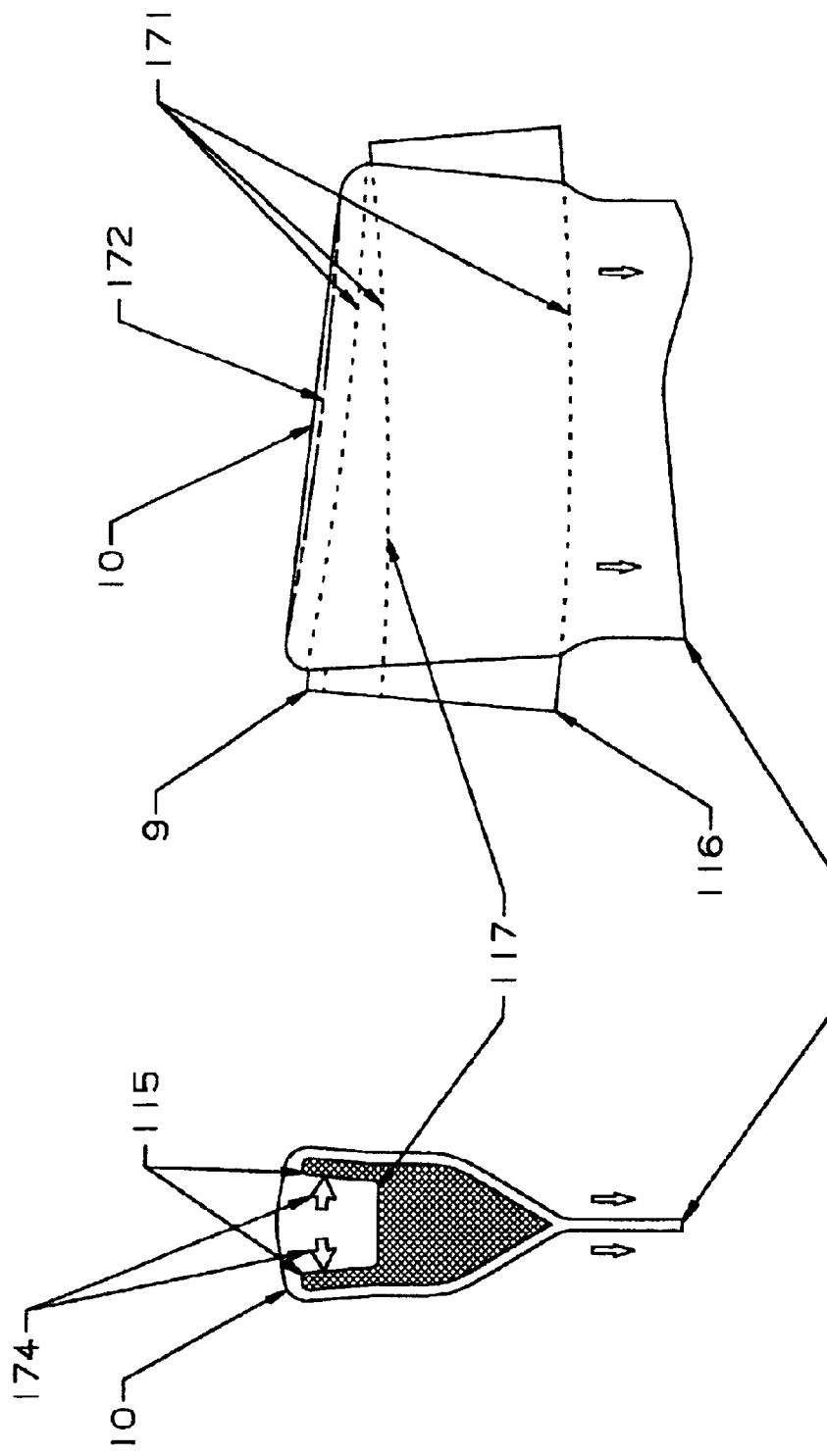

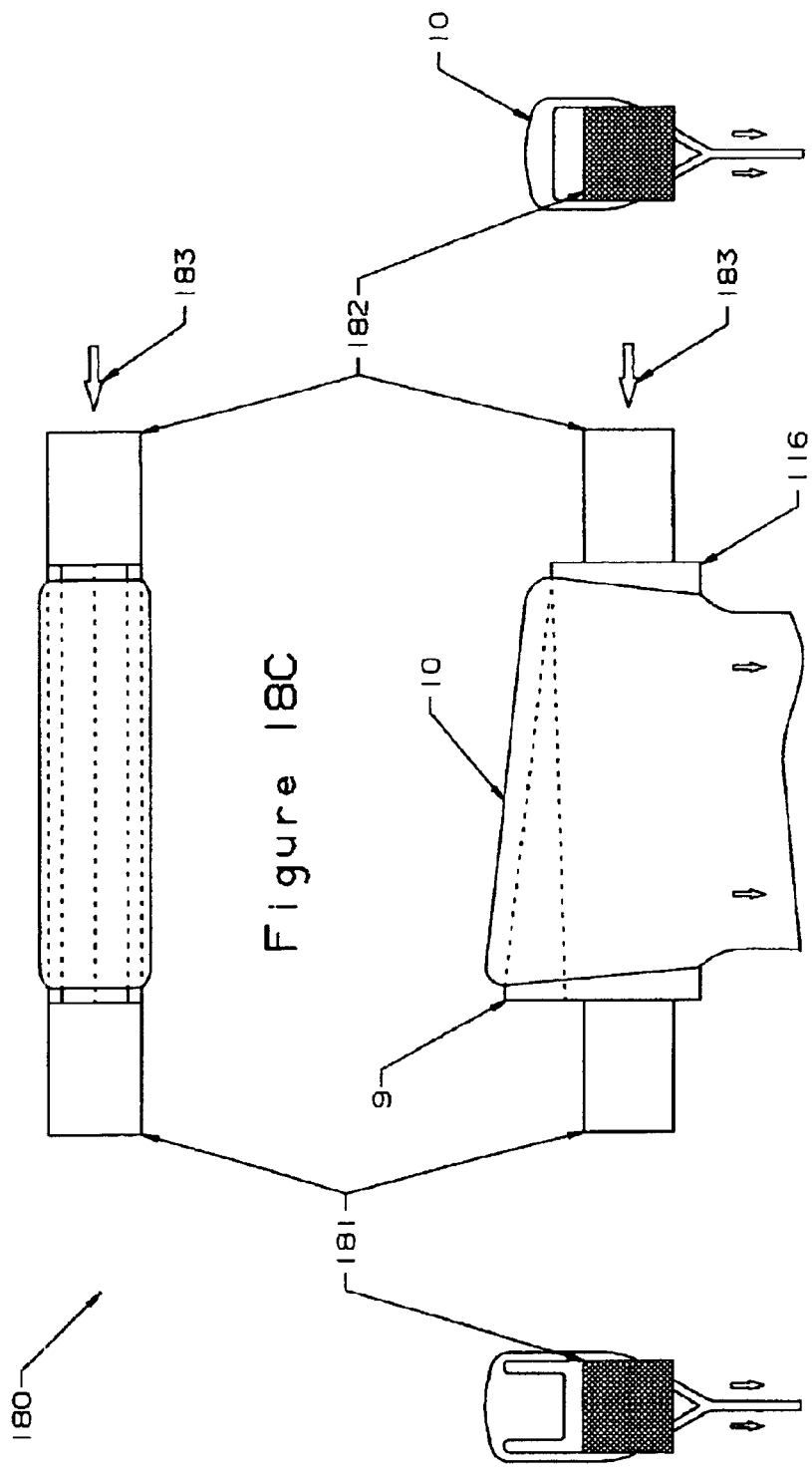

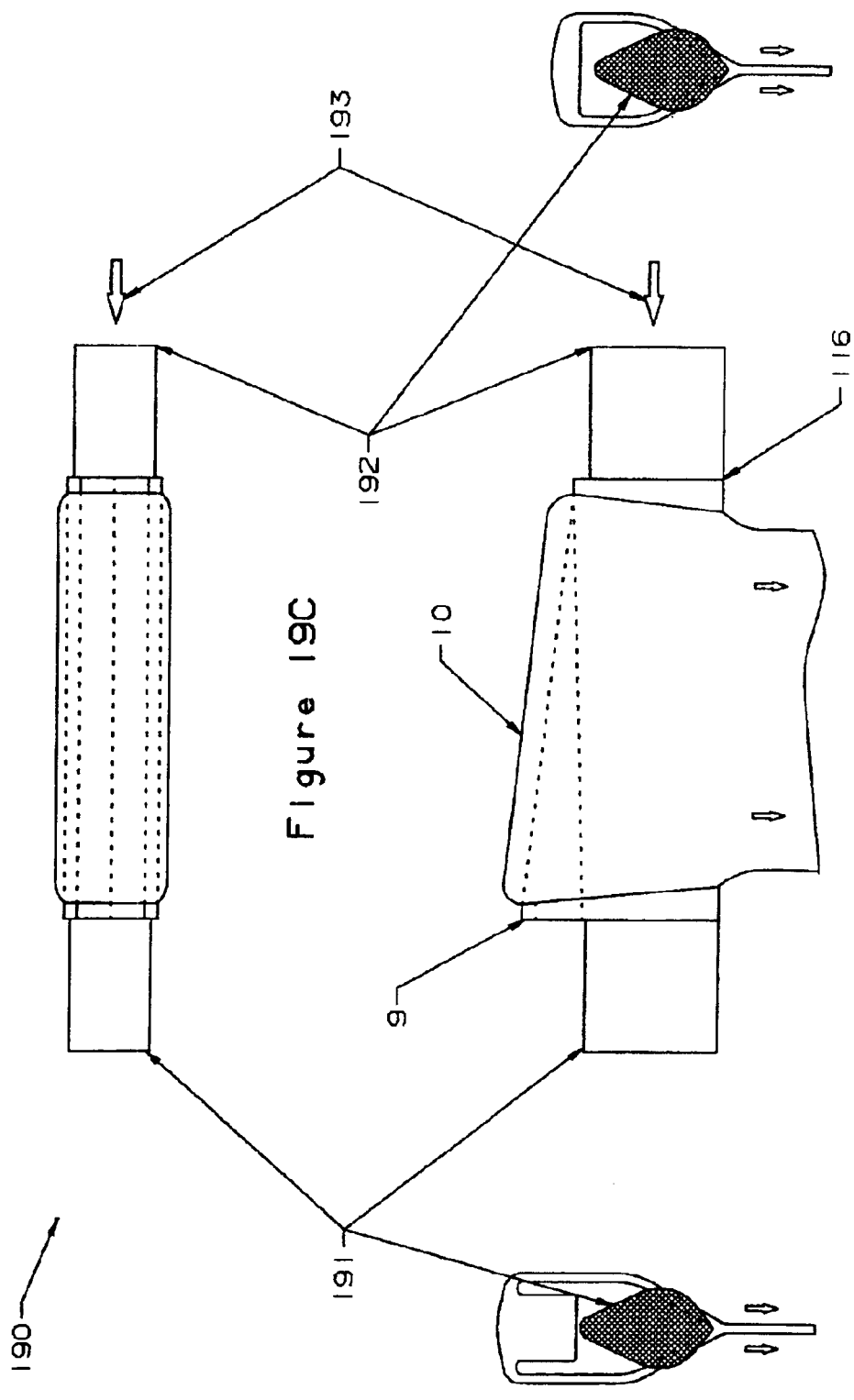

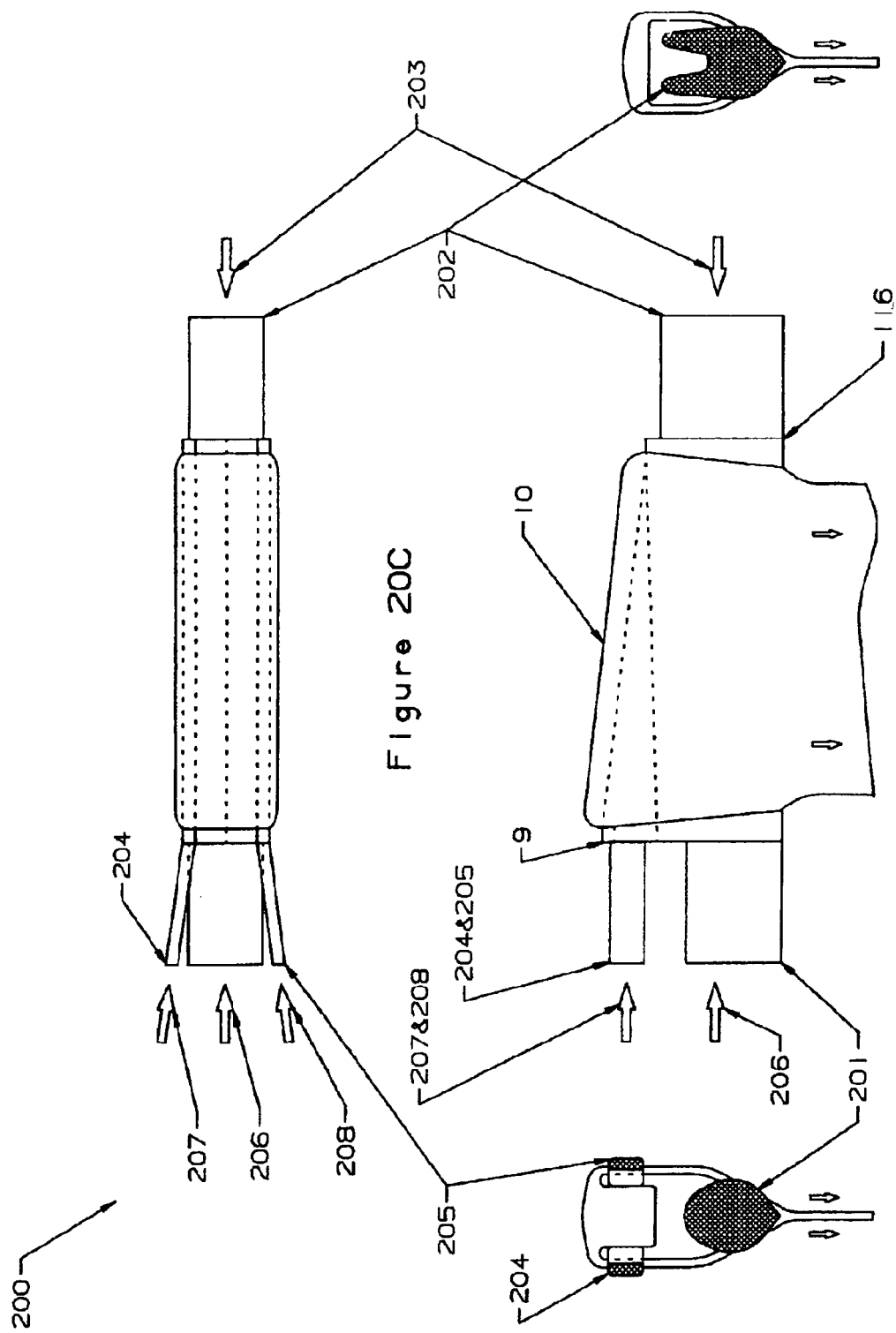

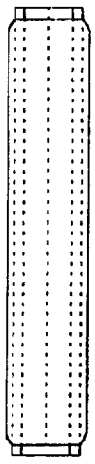
Figure 21B
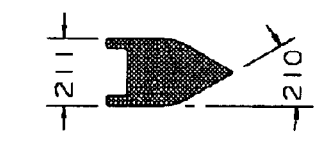
Figure 21C  Figure 21D  Figure 21E  Figure 21F  Figure 21G
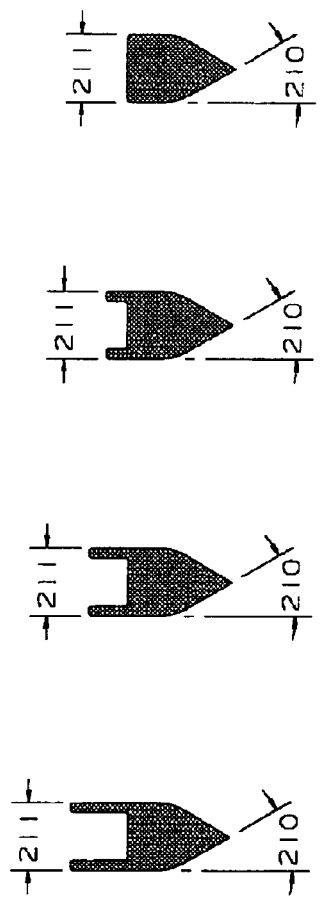
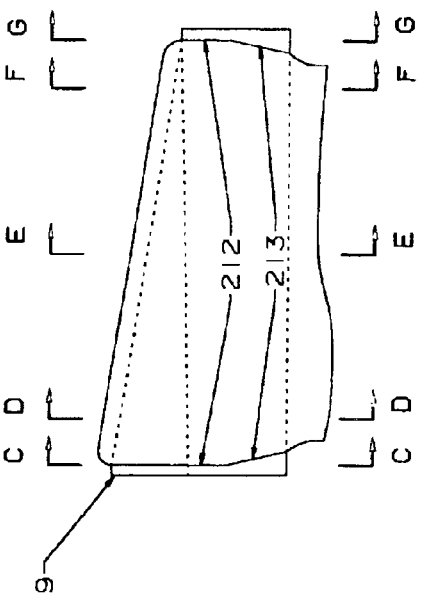
Figure 21A
PRIOR ART

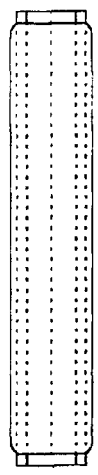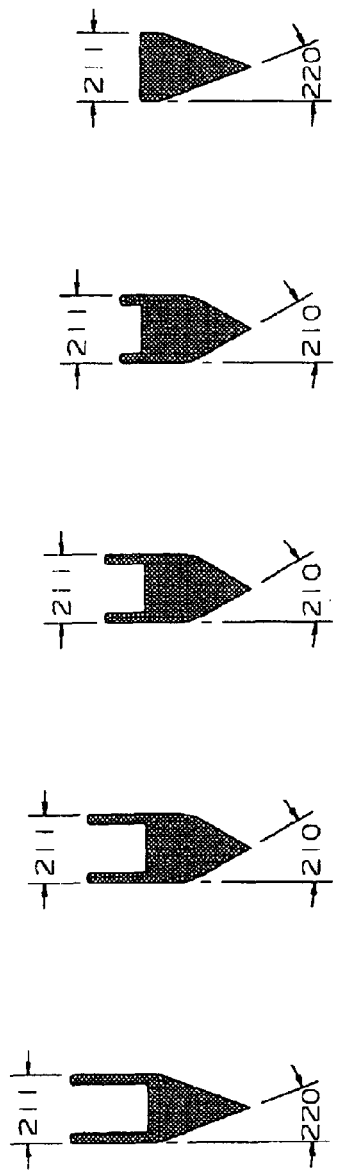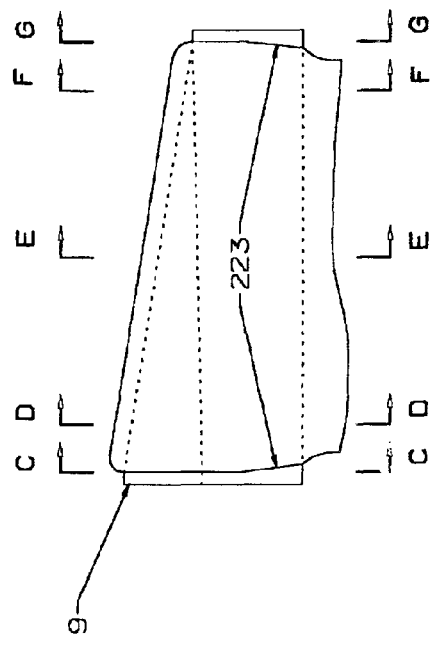

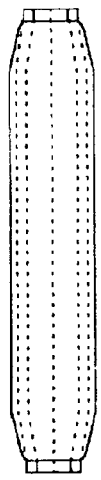
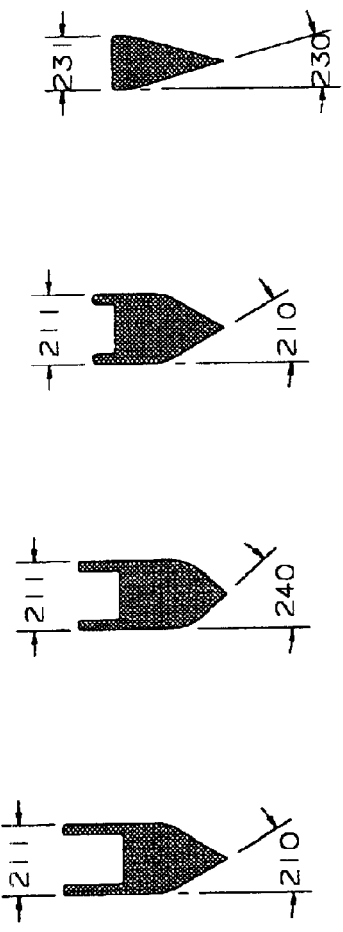
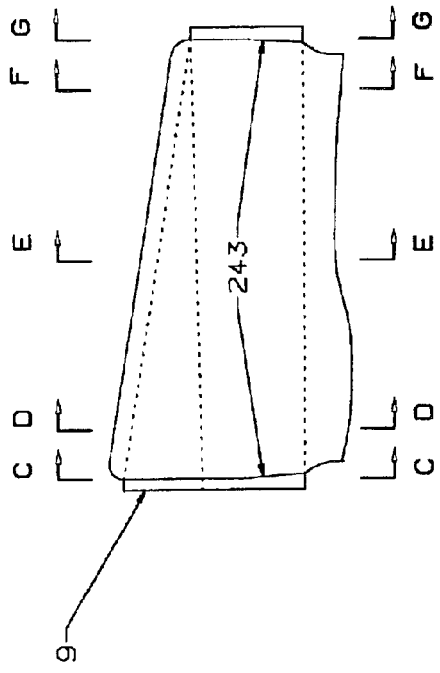

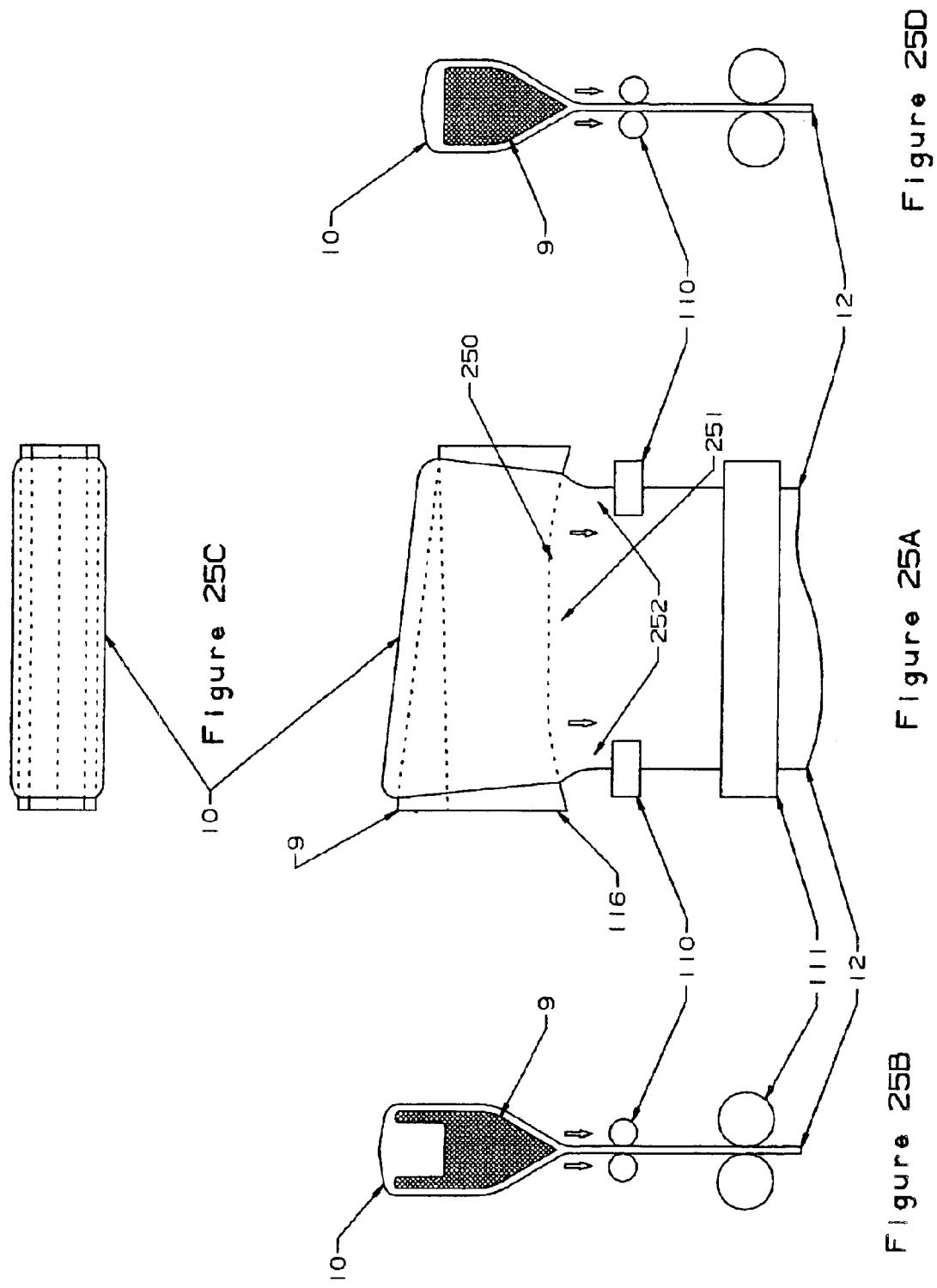

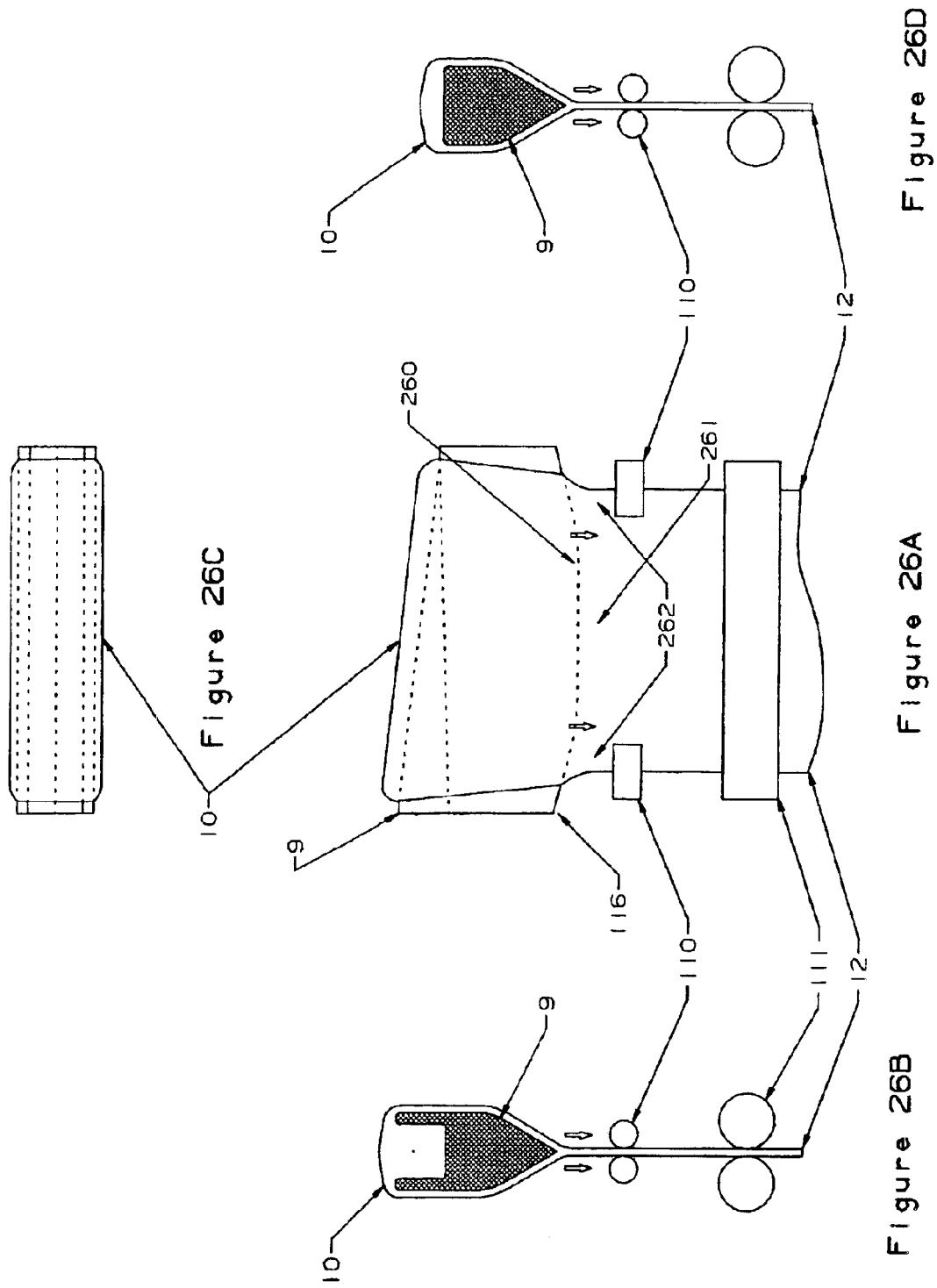

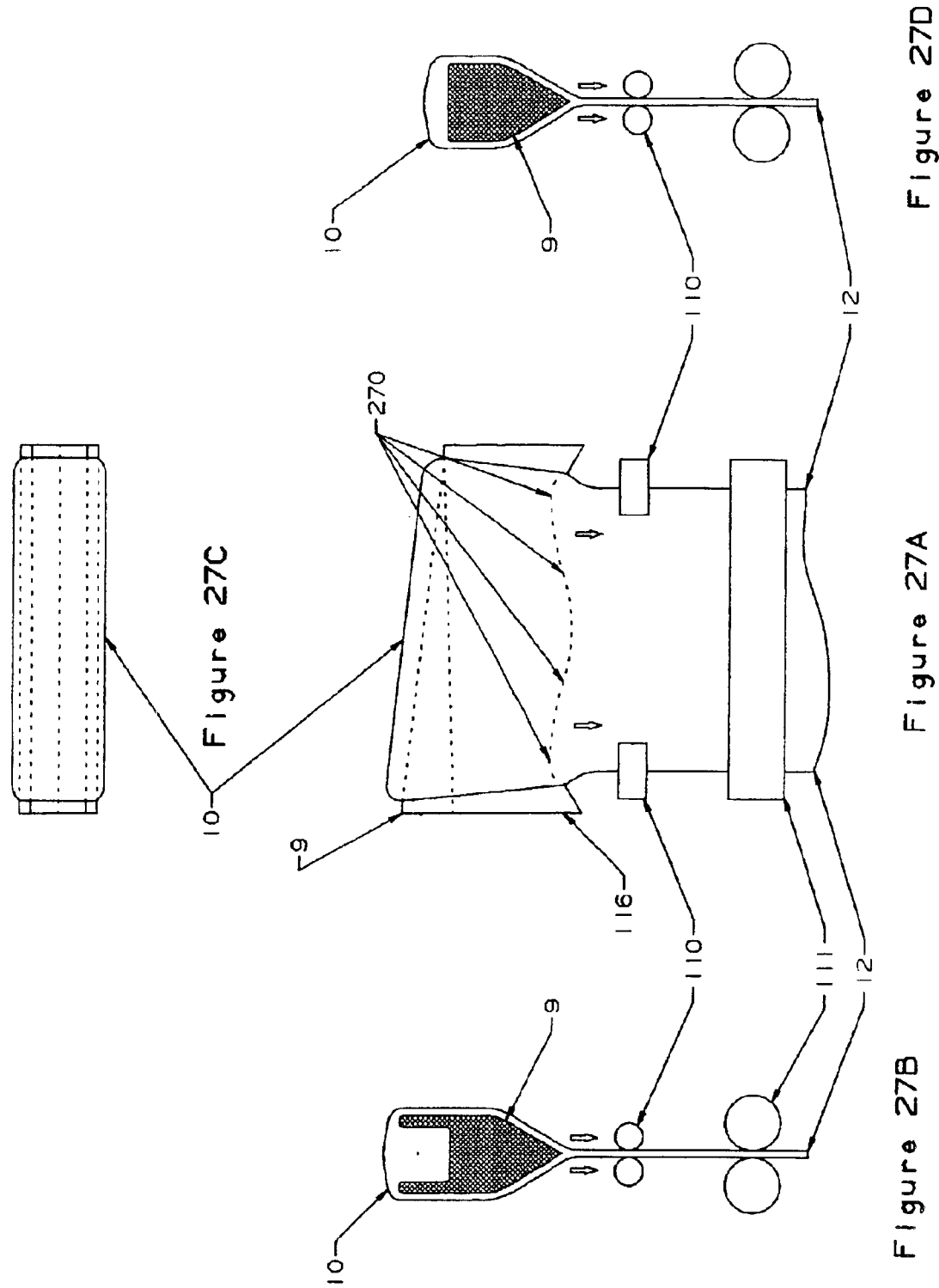

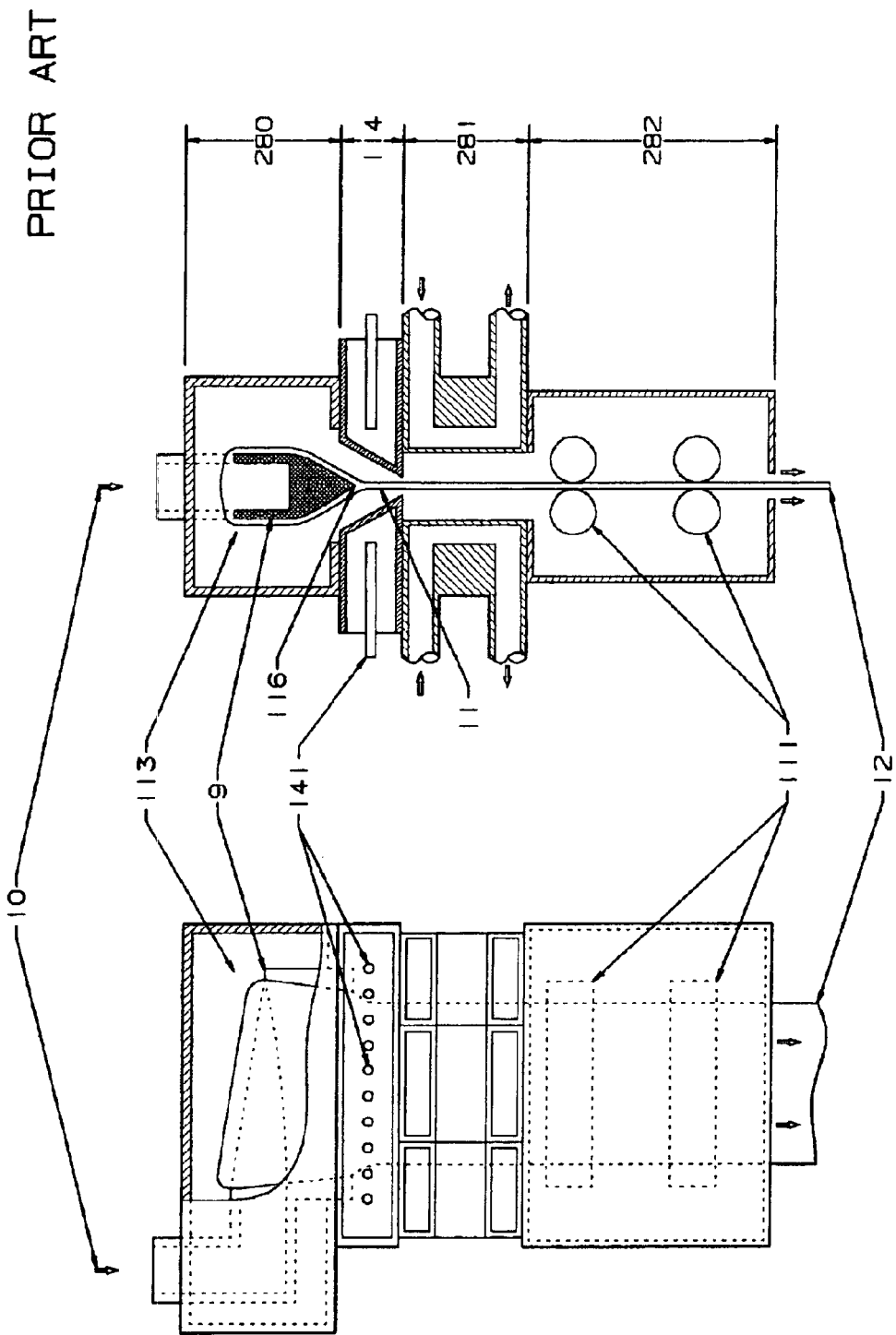

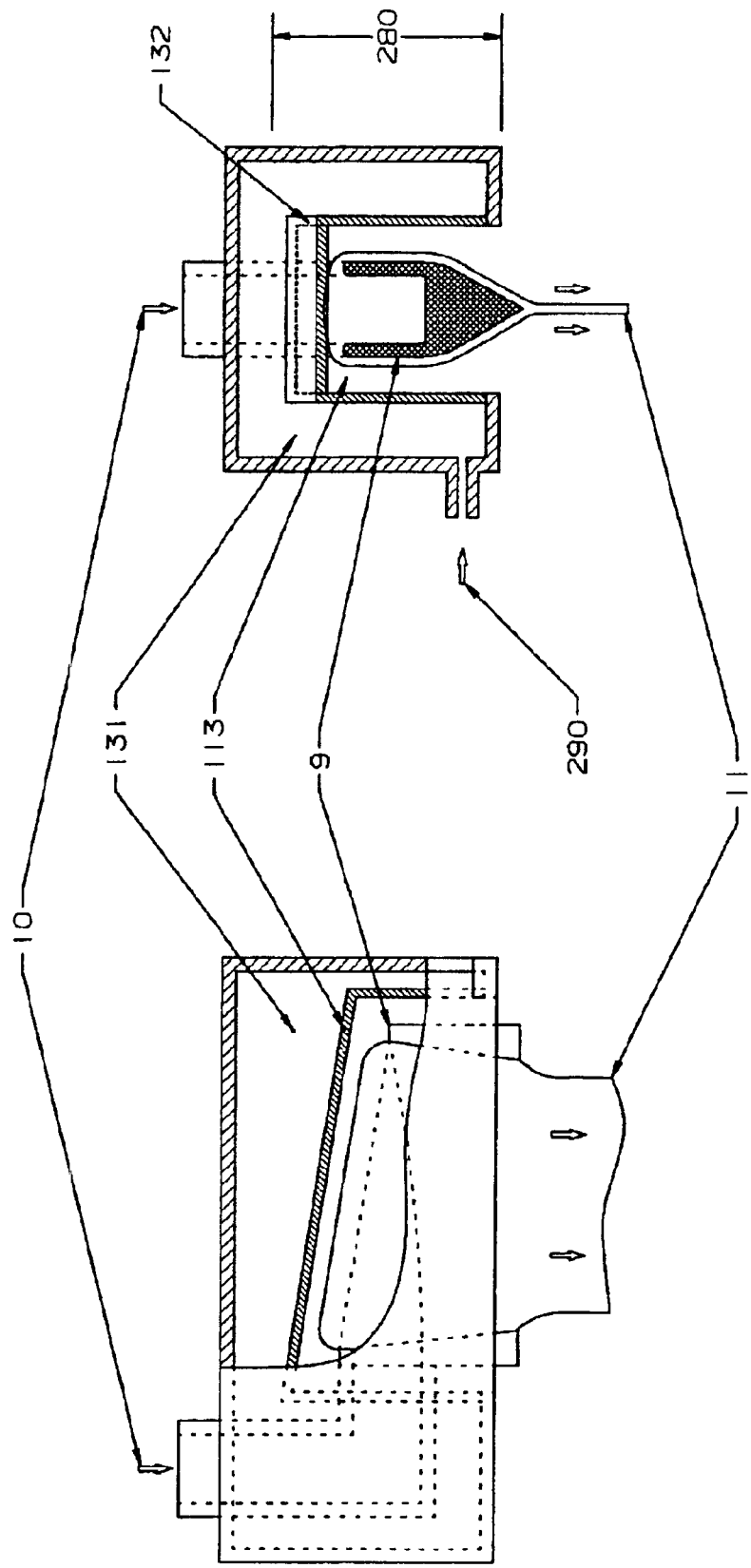

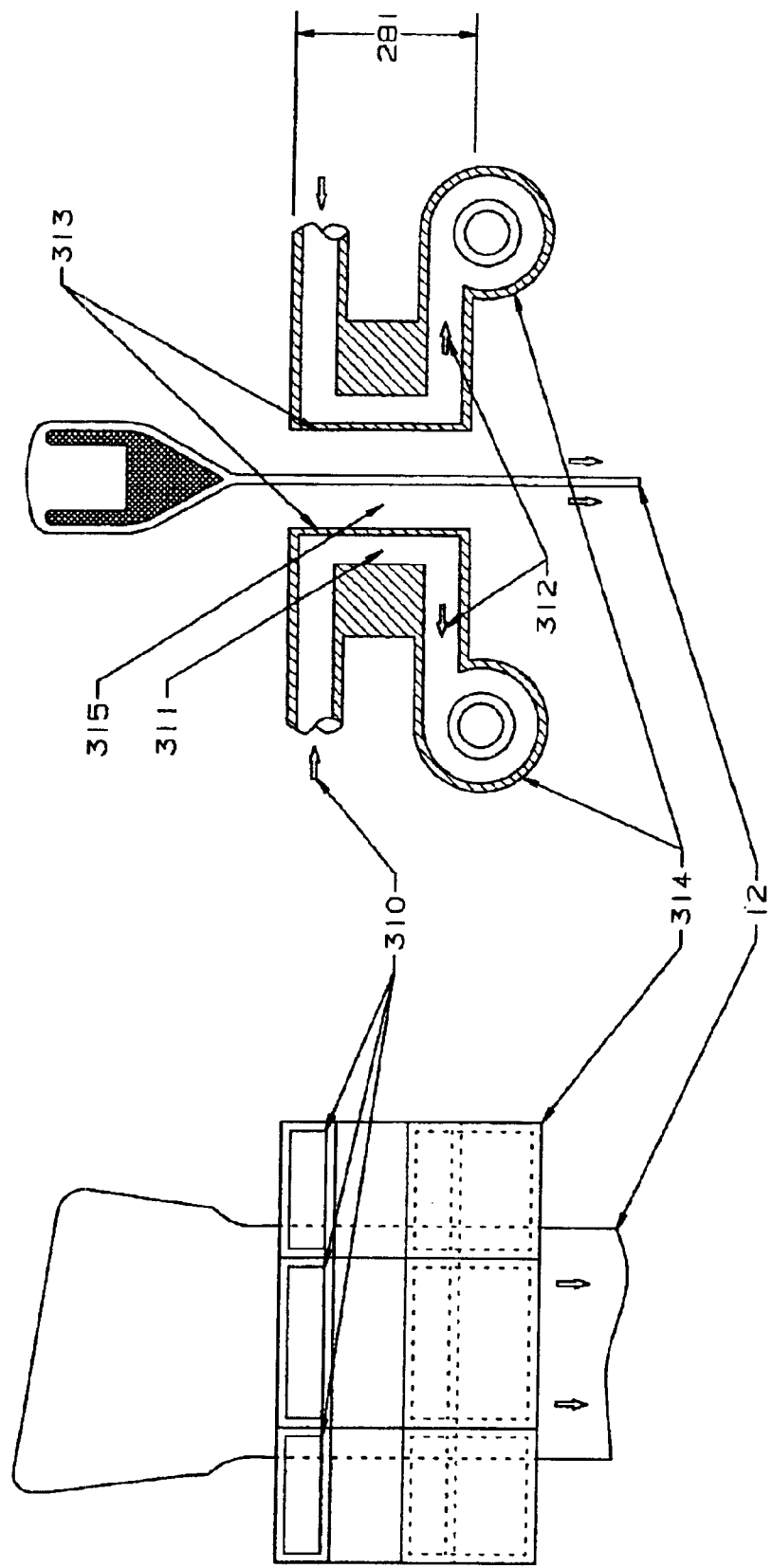

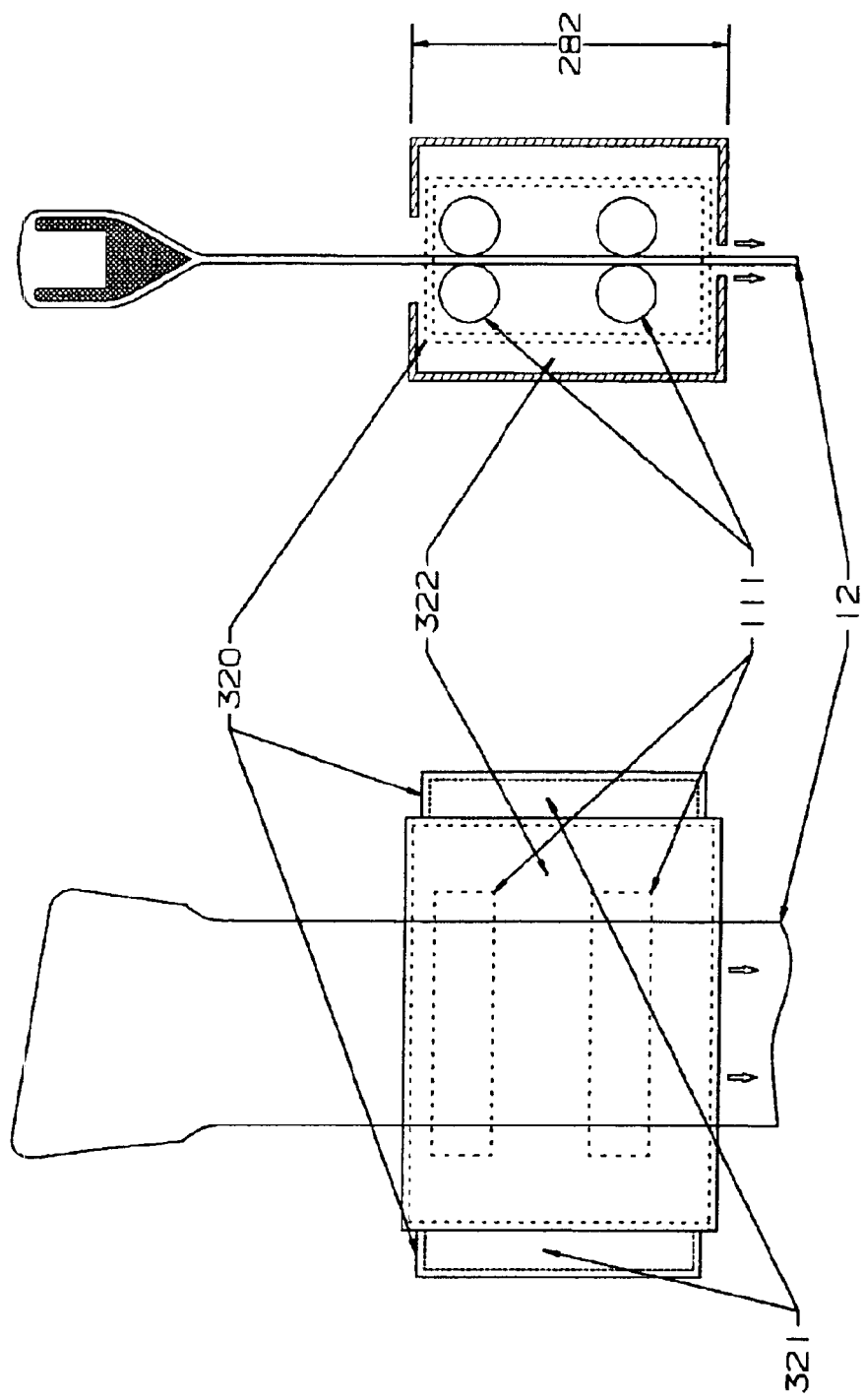

OVERFLOW DOWNDRAWN GLASS FORMING METHOD AND APPARATUS

REFERENCE TO RELATED APPLICATIONS

This application claims an invention that was disclosed in one of the following provisional applications:

1) Provisional Application No. 60/310,989, filed Aug. 8, 2001, entitled "SHEET GLASS FORMING DEVICE";
2) Provisional Application No. 60/316,676, filed Aug. 31, 2001, entitled "SHEET GLASS FORMING DEVICE";
3) Provisional Application No. 60/318,726, filed Sep. 12, 2001, entitled "SHEET GLASS FORMING APPARATUS";
4) Provisional Application No. 60/318,808, filed Sep. 13, 2001, entitled "SHEET GLASS FORMING APPARATUS";
5) Provisional Application No. 60/345,464, filed Jan. 3, 2002, entitled "SHEET GLASS FORMING APPARATUS"; and
6) Provisional Application No. 60/345,465, filed Jan. 3, 2002, entitled "SHEET GLASS FORMING APPARATUS".

The benefit under 35 USC §119(e) of the United States provisional applications is hereby claimed, and the aforementioned applications are hereby incorporated herein by reference.

This application claims an invention related to U.S. application Ser. No. 09/851,627, filed May 9, 2001, entitled "SHEET GLASS FORMING APPARATUS". The aforementioned application is hereby incorporated by reference.

BACKGROUND OF THE INVENTION

1. Field of the Invention

The invention pertains generally to the manufacture of glass sheets, and, more particularly, to glass sheets formed from an overflow process.

2. Description of Related Art

The glass that is used for semiconductor powered display applications, and particularly for TFT/LCD display devices that are widely used for computer displays, must have very high surface quality to allow the successful application of semiconductor type material. Sheet glass made using the apparatus of U.S. Pat. No. 3,338,696, assigned to Corning, Inc., makes the highest quality glass as formed and does not require post-processing. The Corning patent makes glass by a manufacturing process termed: "The Overflow Process". Glass made using other processes requires grinding and/or polishing and thus does not have as fine a surface finish. The glass sheet must also conform to stringent thickness variation and warp specifications. The fine surface finish is formed from virgin glass primarily from the center of the glass stream. This glass has not been in contact with foreign surfaces since the stirring operation.

The teachings of U.S. Pat. No. 3,338,696 are still the state of the art as practiced today. However, the apparatus has limitations.

A major drawback of the apparatus of "The Overflow Process" is that, even though it makes excellent glass over most of the surface, the surface of the glass sheet nearest the inlet is composed of glass that has flowed in proximity to the feeding pipe surfaces and therefore is subject to lower quality.

Another drawback of the apparatus of "The Overflow Process" is that, even though its makes excellent glass during stable operating conditions, it recovers from transient conditions very slowly. This is caused in part by quiescent zones of glass flow in the pipes conducting the glass from the stirring device to the apparatus when these pipes are designed using traditional practice. During unintended process transient these quiescent zones slowly bleed glass of a previous material composition into the main process stream of glass causing defects. These defects eventually subside when the process stabilizes; however, there is a period of time where the quality of the glass sheet is substandard.

Yet another drawback of the apparatus of "The Overflow Process" is the limited means for controlling the thickness of the formed sheet. The selective cooling of the glass with respect to width as the sheet is formed is not provided in current practice.

The thickness control system of U.S. Pat. No. 3,682,609 can compensate for small thickness errors, but it can only redistribute the glass over distances on the order of 5–10 cm.

Another drawback of the apparatus of "The Overflow Process" is that the forming apparatus deforms during a manufacturing campaign in a manner such that the glass sheet no longer meets the thickness specification. This is a primary cause for premature termination of the production run.

A further drawback of the apparatus of "The Overflow Process" is that surface tension and body forces have a major effect on the molten glass flow down the external sides of the forming apparatus causing the sheet to be narrower than the forming apparatus and the edges of the formed sheet to have thick beads.

U.S. Pat. No. 3,451,798 provides for edge directors which endeavor to compensate for the surface tension effects but are in reality a correction for problems created by restricting the forming apparatus cross-section to a single profile on its external surface.

Another drawback of the prior art is that the glass sheet is not inherently flat when drawn from the forming apparatus.

Yet another drawback of the apparatus of "The Overflow Process" is that the drawing of the sheet from the bottom of the apparatus has a propensity to have a cyclic variation in sheet thickness. This cyclic thickness variation is a strong function of uncontrolled air currents, which tend to become more prevalent as the equipment ages during a production campaign. As the apparatus ages, air leaks develop through cracks in material and assorted openings caused by differential expansion.

Therefore, there is a need in the art for an apparatus which overcomes the shortcomings of the prior art.

SUMMARY OF THE INVENTION

In a preferred embodiment of the present invention, all the glass that forms the surface of the useful area of the sheet is virgin glass, which is not contaminated by flow in proximity to a refractory or refractory metal surface after the stirring operation. In addition, this embodiment significantly reduce inhomogeneities in the glass that forms the sheet by relocating or eliminating the regions of quiescent flow in the piping between the stirring device and the sheet glass forming apparatus.

In another preferred embodiment, this invention introduces a precise thermal control system to redistribute the flow of molten glass at the weirs which is the most critical area of the forming process. This thermal control effectively counteracts the degradation of the sheet forming apparatus which inevitably occurs during a production campaign.

In yet another preferred embodiment, the invention introduces a counteracting force to these stresses on the trough in a manner such that the thermal creep which inevitably occurs has a minimum impact on the glass flow characteristics of the forming trough. This embodiment is designed such that this counteracting force is maintained through an extended period of the production campaign. Thus, sheet glass may be manufactured for a longer time with the same forming trough.

Another preferred embodiment creates a variable external cross-section which alters the direction and magnitude of the surface tension and body force stresses and thus, reduces the adverse influence of surface tension and body forces on sheet width.

In an alternative preferred embodiment, the glass is preferentially cooled across its width to create forming stresses during solidification, which ensure that the glass sheet drawn is inherently flat.

In a further preferred embodiment, this invention adjusts the internal pressure in each of the major components of the forming apparatus such that the pressure difference across any leakage path to the forming zone is essentially zero. Therefore, air leakage in the apparatus is minimized even though the cracks and openings exist during initial operation and develop during manufacturing.

BRIEF DESCRIPTION OF THE DRAWINGS

FIG. 1 illustrates the principle parts of "The Overflow Process" glass sheet manufacturing system.

FIG. 3A shows a side view of a surface flow distribution device in a preferred embodiment of the present invention.

FIG. 3B shows a top view of a surface flow distribution device in a preferred embodiment of the present invention.

FIG. 4A shows a side view of a submerged flow distribution device in a preferred embodiment of the present invention.

FIG. 4B shows a top view of a submerged flow distribution device in a preferred embodiment of the present invention.

FIG. 5A shows a side view of "The Overflow Process" in an embodiment of the present invention.

FIG. 5B shows the glass flow in the downcomer pipe across lines B—B of FIG. 5A when a flow distribution device is used.

FIG. 5C shows a cross-section across lines C—C of FIG. 5A, where the glass flow in the downcomer pipe appears in the sheet when a flow distribution device is used.

FIG. 7A shows the top view of a bowl with side inflow which relocates the quiescent flow zone from the bowl nose to the bowl side in a preferred embodiment of the present invention.

FIG. 7B shows a side view of FIG. 7A.

FIG. 7C shows the top view of a bowl with side inflow which relocates the quiescent flow zone from the bowl nose to a location approximately 45 degrees to the side with respect to the centerline of the forming apparatus in a preferred embodiment of the present invention.

FIG. 7D shows a side view of FIG. 7C.

FIG. 9A shows a downcomer pipe feeding the forming apparatus inlet with minimum quiescent flow in a preferred embodiment of the present invention.

FIG. 9B shows a top view of FIG. 9A.

FIG. 9C shows a detail of the downcomer pipe to trough inlet pipe connection showing the glass flow pattern in a preferred embodiment of the present invention.

FIG. 10A shows the flow between the downcomer pipe and the forming apparatus inlet in "The Overflow Process" as known in the prior art.

FIG. 10B shows a top view of FIG. 10A.

FIG. 10C shows a detail of the downcomer pipe to trough inlet pipe connection showing the glass flow pattern as known in the prior art.

FIG. 11A shows the principle parts of a typical "Overflow Process" manufacturing system.

FIG. 11B shows a section of FIG. 11A.

FIG. 12A illustrates a side view of the glass flowing through the forming trough.

FIG. 12B shows a section through the center of the forming trough of FIG. 12A showing the cooling zones.

FIG. 13A shows a revised single heating chamber muffle design in a preferred embodiment of the present invention.

FIG. 13B shows a section of FIG. 13A.

FIG. 14A shows air cooling tubes to effect localized cooling to the molten glass as it passes over the weirs in a preferred embodiment of the invention.

FIG. 14B shows a section of FIG. 14A.

FIG. 17A illustrates how the prior art trough design deforms as a result of thermal creep.

FIG. 17B shows another view of FIG. 17A.

FIG. 18A shows the forming trough support system as known in the prior art.

FIG. 18B shows another view of FIG. 18A.

FIG. 18C shows another view of FIG. 18A.

FIG. 18D shows another view of FIG. 18A.

FIG. 19A shows single shaped compression blocks on each end of the trough in a preferred embodiment of the present invention.

FIG. 19B shows another view of FIG. 19A.

FIG. 19C shows another view of FIG. 19A.

FIG. 19D shows another view of FIG. 19A.

FIG. 20A show a single shaped compression block on one end of the trough and multiple shaped compression blocks on the other end in a preferred embodiment of the present invention.

FIG. 20B shows another view of FIG. 20A.

FIG. 20C shows another view of FIG. 20A.

FIG. 20D shows another view of FIG. 20A.

FIG. 21A shows a trough design as known in the prior art.

FIG. 21B shows a top view of FIG. 21A.

FIG. 21C shows a cross-section of the trough design shown in FIG. 21A across lines C—C.

FIG. 21D shows a cross-section of the trough design shown in FIG. 21A across lines D—D.

FIG. 21E shows a cross-section of the trough design shown in FIG. 21A across lines E—E.

FIG. 21F shows a cross-section of the trough design shown in FIG. 21A across lines F—F.

FIG. 21G shows a cross-section of the trough design shown in FIG. 21A across lines G—G.

FIG. 22A shows a reduced inverted slope at each end of the trough in a preferred embodiment of the present invention.

FIG. 22B shows a top view of FIG. 22A.

FIG. 22C shows a cross-section of the trough design shown in FIG. 22A across lines C—C.

FIG. 22D shows a cross-section of the trough design shown in FIG. 22A across lines D—D.

FIG. 22E shows a cross-section of the trough design shown in FIG. 22A across lines E—E.

FIG. 22F shows a cross-section of the trough design shown in FIG. 22A across lines F—F.

FIG. 22G shows a cross-section of the trough design shown in FIG. 22A across lines G—G.

FIG. 24A shows an alternate embodiment of the present invention with the potential for increased structural stiffness.

FIG. 24B shows a top view of FIG. 24A.

FIG. 24C shows a cross-section of the trough design shown in FIG. 24A across lines C—C.

FIG. 24D shows a cross-section of the trough design shown in FIG. 24A across lines D—D.

FIG. 24E shows a cross-section of the trough design shown in FIG. 24A across lines E—E.

FIG. 24F shows a cross-section of the trough design shown in FIG. 24A across lines F—F.

FIG. 24G shows a cross-section of the trough design shown in FIG. 24A across lines G—G.

FIG. 25A shows a forming trough with a convex upward forming root which solidifies the center glass before the edge glass in a preferred embodiment of the present invention.

FIG. 25B shows another view of FIG. 25A.

FIG. 25C shows another view of FIG. 25A.

FIG. 25D shows another view of FIG. 25A.

FIG. 26A shows a forming trough with a convex downward forming root which solidifies the edge glass before the center glass in a preferred embodiment of the present invention.

FIG. 26B shows another view of FIG. 26A.

FIG. 26C shows another view of FIG. 26A.

FIG. 26D shows another view of FIG. 26A.

FIG. 27A shows a forming trough with a complexly shaped forming root to solidify the glass in a unique manner over its width in a preferred embodiment of the present invention.

FIG. 27B shows another view of FIG. 27A.

FIG. 27C shows another view of FIG. 27A.

FIG. 27D shows another view of FIG. 27A.

FIG. 28A illustrates the cooling process in "The Overflow Process" glass sheet forming system as known in the prior art.

FIG. 28B shows a section of FIG. 28A.

FIG. 29A shows how the pressure in the muffle zone may be controlled to minimize leakage in a preferred embodiment of the present invention.

FIG. 29B shows a section of FIG. 29A.

FIG. 31A shows how the pressure in the transition zone may be controlled to minimize leakage in a preferred embodiment of the present invention.

FIG. 31B shows a section of FIG. 31A.

FIG. 32A shows how the pressure in the annealer and pulling machine zone may be controlled to minimize leakage in a preferred embodiment of the present invention.

FIG. 32B shows a section of FIG. 32A.

DETAILED DESCRIPTION OF THE INVENTION

Figure 2C:
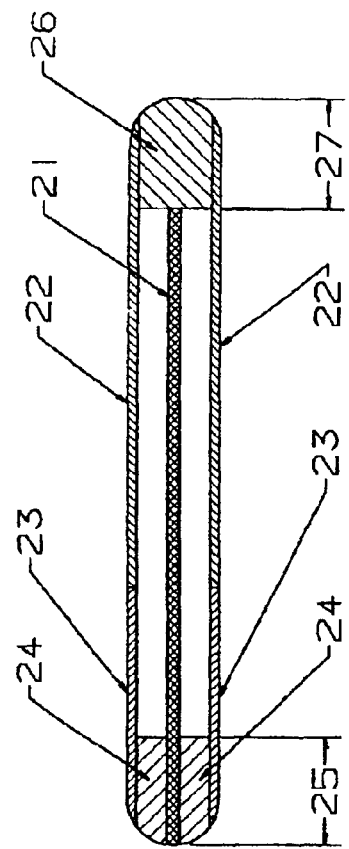
FIG. 2C shows a cross-section across lines C—C of FIG. 2A, where the glass flow in the downcomer pipe appears in the sheet for "The Overflow Process".

The flow dynamics of this invention are such that the outside surfaces of the glass sheet are formed from thoroughly mixed virgin glass that comes from the center of the glass stream flowing into the forming apparatus and thus has not contacted a refractory or refractory metal surface. This produces the highest possible surface quality. This pristine surface is essential for the manufacture of LCD/TFT semiconductor display devices. In addition, the flow dynamics in all embodiments of this invention are such that the flow rate of molten glass to the forming wedge at the bottom of the forming trough is substantially uniform over its width.

Referring to FIGS. 1, 11A and 11B, a typical "Overflow Process" manufacturing system (1) is shown. The glass (10) from the melting furnace (2) and forehearth (3), which must be of substantially uniform temperature and chemical composition, feeds a stirring device (4). The stirring device (4) thoroughly homogenizes the glass. The glass (10) is then conducted through a bowl inlet pipe (5), into a bowl (6), and down into the downcomer pipe (7), through the joint (14) between the downcomer pipe (7) and the forming apparatus inlet pipe (8), to the inlet of the overflow trough (9). While flowing from the stirring device (4) to the trough (9), the glass (10), especially that which forms the sheet surface, must remain homogeneous. The normal purpose of the bowl (6) is to alter the flow direction from horizontal to vertical and to provide a means for stopping the flow of glass (10). A needle (13) is provided to stop glass flow. The normal function of the joint (14) between the downcomer pipe (7) and the trough inlet pipe (8) is to allow for removal of the sheet glass forming apparatus for service as well as a means of adjustment of the process equipment.

The molten glass (10) from the melting furnace and forehearth, which must be of substantially uniform temperature and chemical composition, enters the sheet forming apparatus through the inlet pipe (8) to the sheet forming trough (9). The inlet pipe (8) is preferably shaped to control the velocity distribution of the incoming molten glass flow. The glass sheet forming apparatus, which is described in detail in both U.S. Pat. No. 3,338,696 and patent application Ser. No. 09/851,627, herein incorporated by reference, is a wedge shaped forming device (9). Straight sloped weirs (115), substantially parallel with the pointed edge of the wedge (root) (116), form each side of the trough. The bottom of the trough (117) and sides of the trough (118) are contoured in a manner to provide even distribution of glass to the top of each side weir (115). The glass then flows over the top of each side weir (115), down each side of the wedge shaped forming device (9), and joins at the pointed edge of the root (116), to form a sheet of molten glass (11). The sheet of molten glass (11) is then cooled as it is pulled off the root (116) by pulling rollers (111) to form a solid glass sheet (12) of substantially uniform thickness. Edge rollers (110) may also be used to draw the molten glass sheet (11). In the prior art, the forming trough (9) is encased within a muffle whose purpose is to control the temperature of the forming trough (9) and the molten glass (10). It is normal practice to maintain a uniform temperature in the muffle chamber (113) surrounding the forming trough (9). Cooling the glass as it transitions from the molten state to the solid state must be carefully controlled. This cooling process starts on the lower part of the forming apparatus (9) just above the root (116), and continues as the molten glass sheet passes through the muffle door zone (114). The molten glass is substantially solidified by the time it reaches the pulling rollers (111). The molten glass forms a solid glass sheet (12) of substantially uniform thickness.

Altering Glass Flow Distribution

Referring also to FIGS. 2 through 10, a preferred embodiment of the present invention alters the flow path at the inlet of the sheet glass forming apparatus to improve surface quality. It also facilitates more uniform flow of glass through the piping that conducts the glass from the stirring device to the sheet glass forming apparatus.

U.S. Pat. No. 3,338,696 considers only the glass flow within the forming trough. U.S. Pat. No. 3,338,696 also claims that the entire sheet surface is formed from virgin glass, which has not been adversely effected by contact with a foreign surface. This is not entirely correct as the sheet formed on the inlet end of the trough has flowed on the piping system front surface. A flow distribution device is added at the trough inlet in this invention to ensure that all of the useable sheet surface is formed from virgin glass. The piping system between the glass stirring device and the glass sheet forming apparatus is modified from traditional practice in the bowl and at the connection between the downcomer pipe and the forming apparatus inlet pipe. The flow through the bowl is altered, either eliminating or relocating the quiescent flow zone that normally forms at the front top surface of the bowl. The downcomer pipe is not submerged in the forming apparatus inlet pipe glass thus eliminating the quiescent flow zone between the pipes.

Figure 2B:
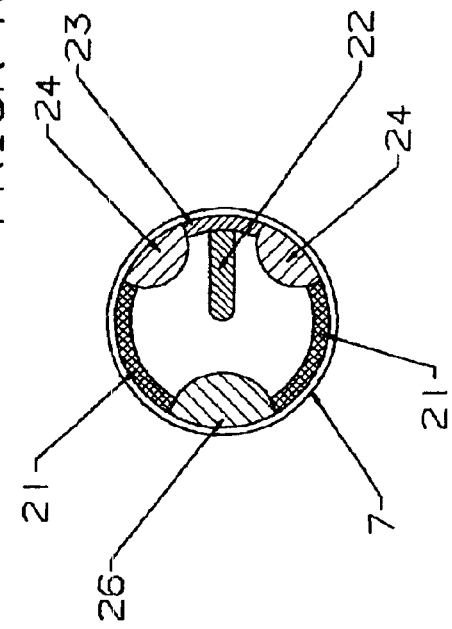
FIG. 2B shows a cross-section of the glass flow in the downcomer pipe across lines B—B of FIG. 2A.
Figure 2A:
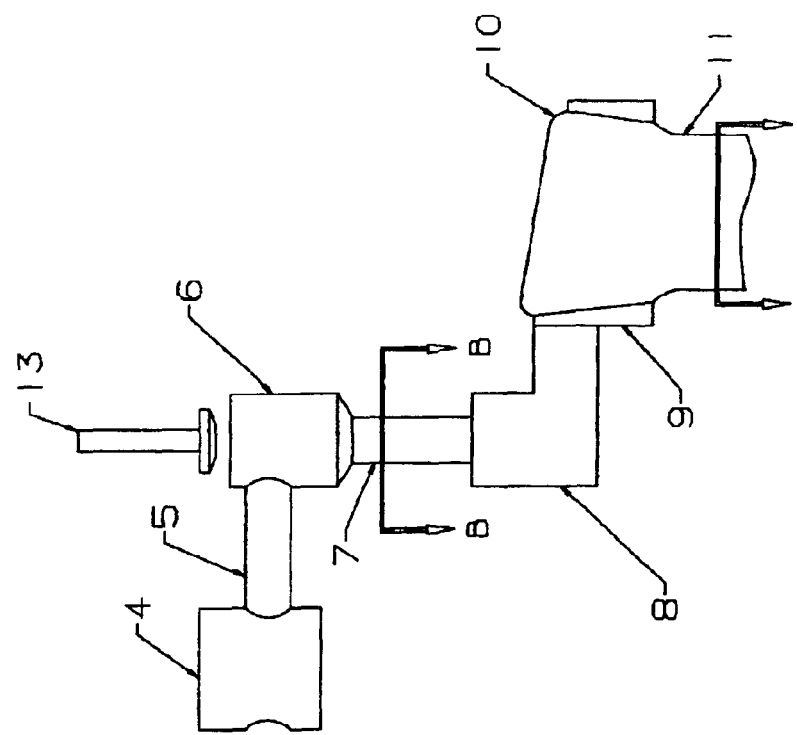
FIG. 2A shows a side view of "The Overflow Process" as known in the prior art.

FIGS. 2A through 2C illustrate where the glass (10) flowing in the downcomer feed pipe (7) ends up in the formed glass sheet in the prior art "Overflow Process". The glass flow in proximity to the sides (21) of the downcomer pipe (7) ends up in the center of the drawn sheet. The flow (23) in proximity to the front surface of the downcomer pipe (7) is distributed over the entire glass surface, however, it is most concentrated on the approximate one third of the sheet at the inlet end. This surface glass (23) is subject to disruption by the downcomer pipe surface and by the glass in the quiescent zones in the bowl (6) and at the downcomer pipe (7) to inlet pipe (8) connection (14). The surface of the remaining substantially two thirds of the sheet is formed from virgin interior glass (22). Two other portions of the glass flow (24) which are symmetrically offset from the front surface at an angle of approximately 45 degrees end up forming the near end unusable edge section (25) at the inlet end of the sheet. Another portion (26) centered at the back surface at an angle of approximately 180 degrees proceeds to the far end unusable edge section (27).

FIGS. 3A and 3B show an embodiment of the glass sheet forming apparatus (31) with an inflow pipe (8), a flow distribution device (32) (which is a subject of this invention) located at the trough inlet surface, and the glass sheet forming apparatus body (9). The flow distribution device (32) interrupts the glass surface flow and diverts it to the surface in the edge of the sheet. Glass from the center of the downcomer pipe flow stream then comes to the surface of the forming trough to form the surface of the useable portion of the glass sheet (11). Note that ten to twenty percent of the sheet at each edge is normally unusable for various reasons.

FIGS. 4A and 4B show an alternative embodiment of the glass sheet forming apparatus (41), which performs the same function as the embodiment in FIG. 3 except that the surface flow distribution device (42) is located under the surface of the glass (10) and redistributes the surface flow in a more subtle but equally effective manner. The glass flow (10) that forms the unusable inlet edge of the sheet, flows through the center slot (43) in the flow distribution device (42). The glass (which flows through this center slot) is the glass that has been in proximity to the front surface of the downcomer pipe. Glass from the center of the downcomer pipe then flows to the trough surface to form the surface of the useable portion of the sheet (11). Other glass that flows in proximity to the surface of the downcomer pipe remains submerged.

FIGS. 5A through 5C illustrate where the glass (10) flowing in the downcomer feed pipe (7) ends up in the formed glass sheet for the inventions described in FIGS. 3 and 4. The glass flow to the center of the sheet (21) is virtually identical to that in the prior art. However, the flow (52) which forms the outside surface of the formed glass sheet does not flow in proximity to the front surface of the downcomer pipe (7). The two portions of the glass flow (24) which are symmetrically offset from the front surface at an angle of approximately 45 degrees and which end up forming the unusable edge section (25) at the inlet end of the sheet are substantially unaffected, as is the glass flow (26) which ends up in the unusable edge section (27).

Figure 6:
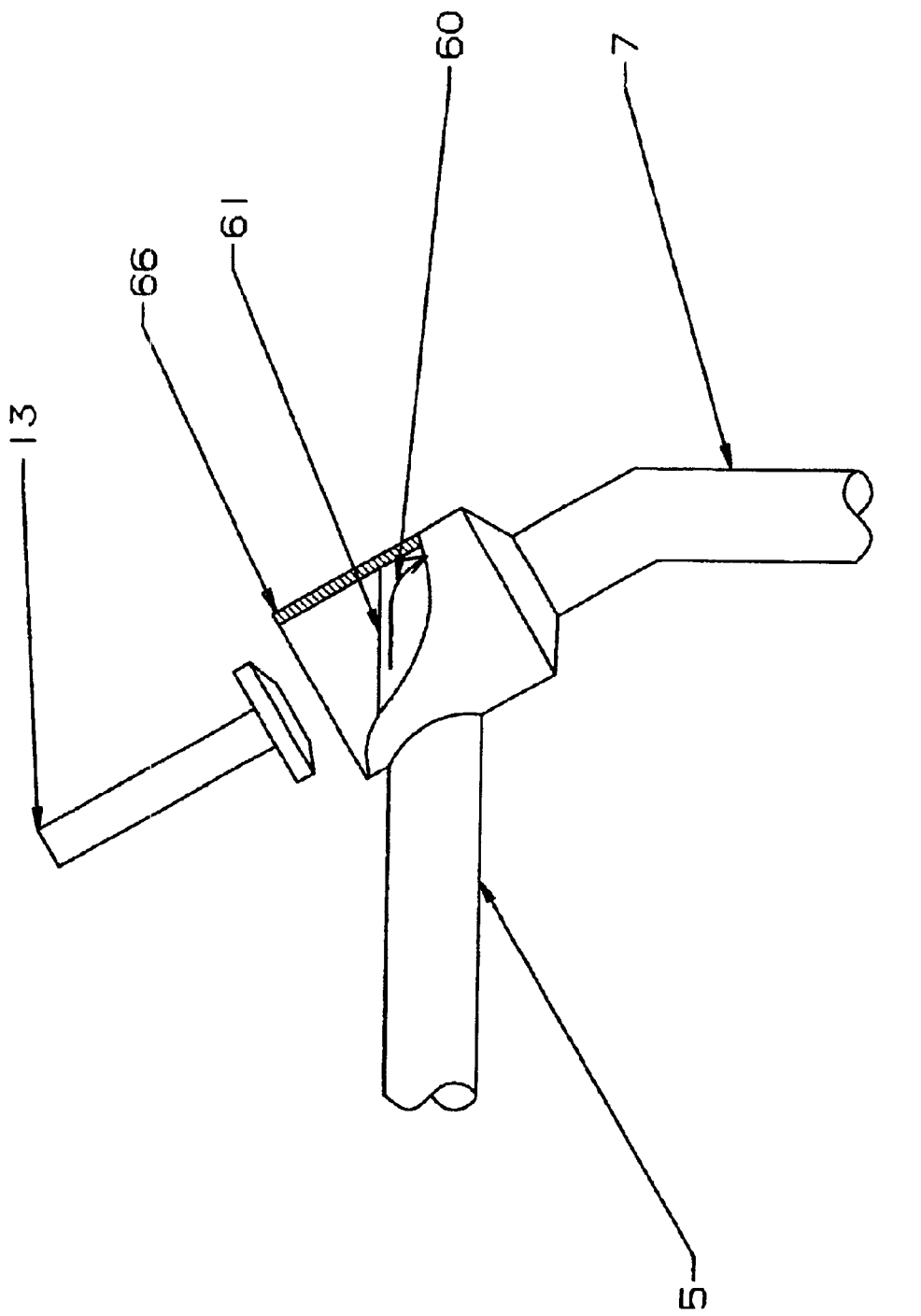
FIG. 6 shows a bowl with an inclined axis which diffuses the quiescent flow zone at the bowl nose in a preferred embodiment of the present invention.
Figure 8:
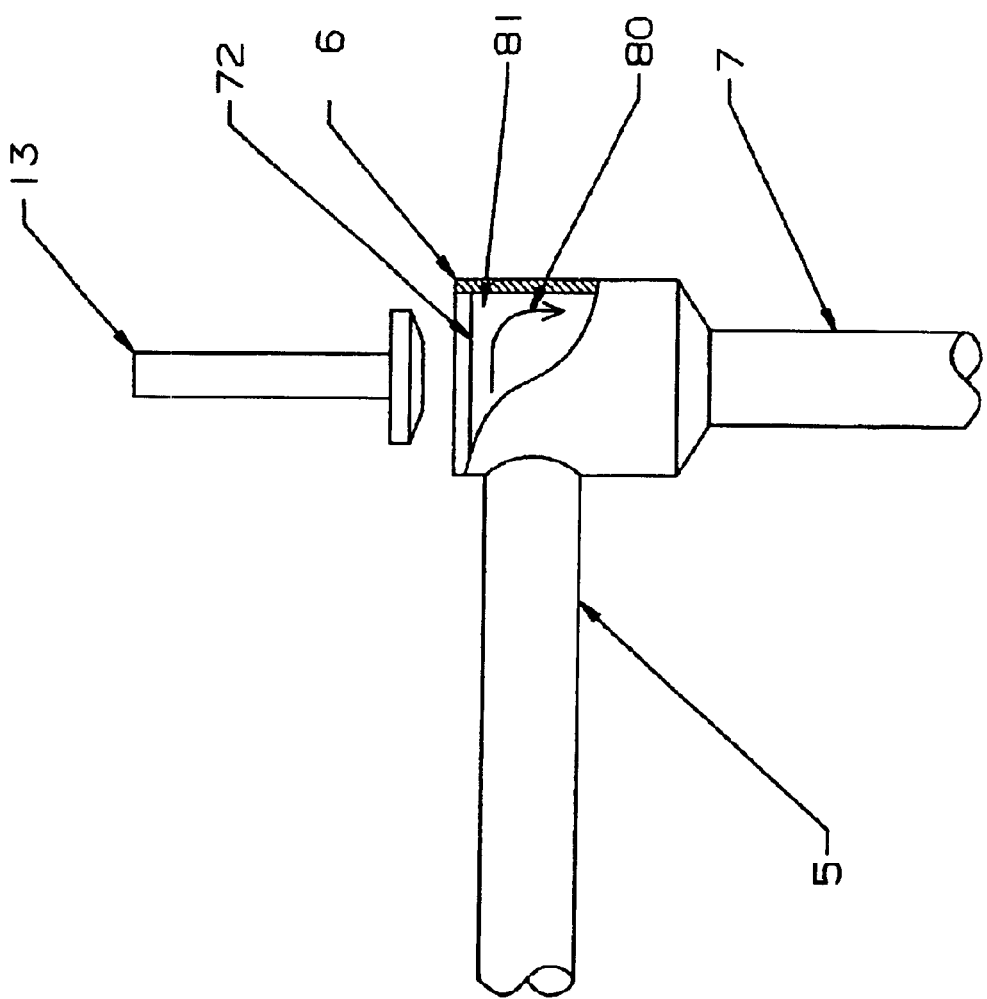
FIG. 8 illustrates a bowl in "The Overflow Process" as known in the prior art.

FIG. 6 is an embodiment that shows the axis of the bowl (66) inclined at an angle such that the main process stream passes through the front of the bowl. This active flow (60) entrains the surface glass (61), overcoming the surface tension forces that would normally create a quiescent zone of glass flow located at the bowl nose (FIG. 8). A needle (13) is present to stop glass flow.

FIGS. 7A through 7D show an embodiment of the present invention where a crossways motion of the glass in the bowl (76) is facilitated by feeding the glass in the pipe coming from the stirring device to the bowl (75), into the side of the bowl (76) at an angle (74) with respect to the centerline (73) of the forming apparatus (9). This effectively changes the flow pattern (70) in the bowl such that the quiescent zone normally located at the bowl nose (81, FIG. 8) is moved to the side of the bowl (71). Referring back to FIGS. 2A–2C and 5A–5C, depending on the angle (74) of the flow in the bowl with respect to the centerline (73) of the forming apparatus (9), the glass from the quiescent zone (71) ends up in either the unusable portion of the edges (25), (27) or is submerged in the center of the glass sheet (21) instead of on the surface of the glass sheet (23). The glass free surface (72) in the bowl is also shown.

FIG. 8 illustrates the prior art with a bowl (6) which shows the quiescent zone (81) of glass that is located at the front of the bowl (6). This glass is kept in place by a combination of low process stream flow (80) at the front of the bowl and surface tension.

FIGS. 9A through 9C show an embodiment of the present invention where the bottom end (94) of the downcomer pipe (97) is located substantially above the glass free surface (90) in the forming apparatus inlet pipe (98). The bottom end of the downcomer pipe (97) and the forming apparatus inlet (98) also have a specific size and shape, (95) and (92), respectively. The vertical distance (93) and the size and shape (92) of the forming apparatus inlet (98) is specifically designed to minimize any zone of quiescent or vortex flow in the glass flow path (91). Thus, the molten glass (10) forms a more homogenous sheet (11). This design is determined by solution of the fluid flow equations (Navier-Stokes Equations) and by experimental tests.

FIGS. 10A through 10C show a downcomer pipe (7) submerged in the molten glass surface (100) in the forming apparatus inlet pipe (8) as known in the prior art. There is a quiescent zone (101) between the two pipes (7) and (8). The glass flow path (103) produces an annular vortex (102) of glass between the downcomer pipe (7) and the trough inlet pipe (8). The vortex exchanges little material with the main process stream except during flow transients at which time it produces defects in the glass sheet.

Reducing Degradation of Sheet Glass Forming Apparatus

Referring now to FIGS. 12 through 16, another embodiment of the present invention controls the flow distribution of glass on the forming apparatus in a manner such that the degradation of the production apparatus and the deformation of the forming trough that results from thermal creep is compensated by thermal control of the glass flow distribution.

U.S. Pat. No. 3,338,696 relies on a specifically shaped forming trough to distribute the glass in a manner to form a sheet of uniform thickness. The basic shape of this forming trough is described in detail in U.S. Pat. No. 3,338,696. The sheet glass forming process is conducted at elevated temperatures, typically between 1000° C. and 1350° C. At these temperatures, the refractory materials used for construction of the forming trough exhibit a property called thermal creep, which is deformation of the material cause by applied stress. Thus, the trough deforms under the stress caused by its own weight and the stress caused by the hydrostatic pressure of the glass in the trough.

The materials used in the construction of the other parts of the forming apparatus also degrade (warp, crack, change thermal properties, etc.) in an indeterminate way, which has an adverse effect on thickness distribution. The thickness control system of U.S. Pat. No. 3,682,609 can compensate for small thickness errors, but it can only redistribute the glass over distances on the order of 5–10 cm. To significantly effect thickness distribution over the entire width of the glass sheet, the flow of the molten glass over the weirs must be controlled.

This embodiment of the invention solves this problem by introducing a precise thermal control system to redistribute the flow of molten glass at the weirs, which is the most critical area of the forming process. This thermal control effectively counteracts the degradation of the sheet forming apparatus which inevitably occurs during a production campaign.

FIG. 12A shows the side view of the forming trough (9) with arrows showing the flow of molten glass (10) through the forming trough (9) to the side weirs (115). FIG. 12B shows a section through the center of the forming trough (9) which shows the different zones for the control of molten glass (10) as it flows through the forming apparatus. Zone (121) is the flow from the inlet end of the trough to the far end, zone (122) is the flow over the weirs, zone (123) is the flow down the outside of the forming trough, and zone (124) is the molten glass (11) being pulled off the root (116) and cooling into a solid sheet (12). The effect on the solid glass sheet (12) thickness caused by heating or cooling the molten glass (10) as it passes through each zone is different. Adding energy to (raising the temperature of) or removing energy from the molten glass (10) as it flows from the inlet end to the far end of the forming trough (9) in zone (121) produces concave or convex sheet thickness profiles respectively. The period of the thickness profile changes effected in zone (121) is on the order of the length of the trough.

Changes to the energy flux to the molten glass (10) as it flows over the weirs (115) in zone (122) has a powerful effect on the resultant solid glass sheet thickness distribution. Localized cooling of the glass in zone (122) effectively produces a dam, which has a large effect on glass flow. This is an extremely sensitive zone, and any control strategy other than isothermal must be carefully designed. Zone (123) is important to return the glass to a uniform temperature distribution, substantially linear in the longitudinal direction, in order that the drawing process at the root (116) is consistent. Differential cooling in zone (124) is the object of U.S. Pat. No. 3,682,609 and is effective in making small thickness distribution changes. Cooling at given longitudinal location affects the thickness at that location in one direction and conversely to the glass on each side of the location. The effect is longitudinal redistribution of the glass over a distance on the order of centimeters.

FIGS. 13A and 13B show an embodiment of this invention whereby the top and sides of the muffle (132) are shaped more closely to the outside surface of the molten glass (10) that is flowing in and on the forming trough (9). The muffle (132) is heated by heating elements in heating chamber (131). The primary heat transfer medium in the muffle chamber (113) is radiation. By designing the muffle (132) to conform closely to the outside shape of the molten glass (10), energy may be directed to targeted areas of the molten glass (10), thereby effecting greater control of temperature distribution. The heating elements in the heating chamber (131) have adequate power to balance the energy flux to the forming trough (9) and thus create suitable temperature conditions.

FIGS. 14A and 14B show an embodiment of this invention which effects localized cooling of the molten glass (10) as it passes over the weirs (115) in zone (122). The muffle (132) configuration of FIGS. 13A and 13B is used. Air cooling tubes (142), similar in function to those air cooling tubes (141), which are described in U.S. Pat. No. 3,682,609, are directed at the heating chamber side of the muffle (143) just above the molten glass (10) flowing over the weirs (115). Localized cooling of the glass in this location effectively produces a localized dam, which has a significant effect on the thickness distribution of the solid glass sheet.

Figures 15A, 15B:
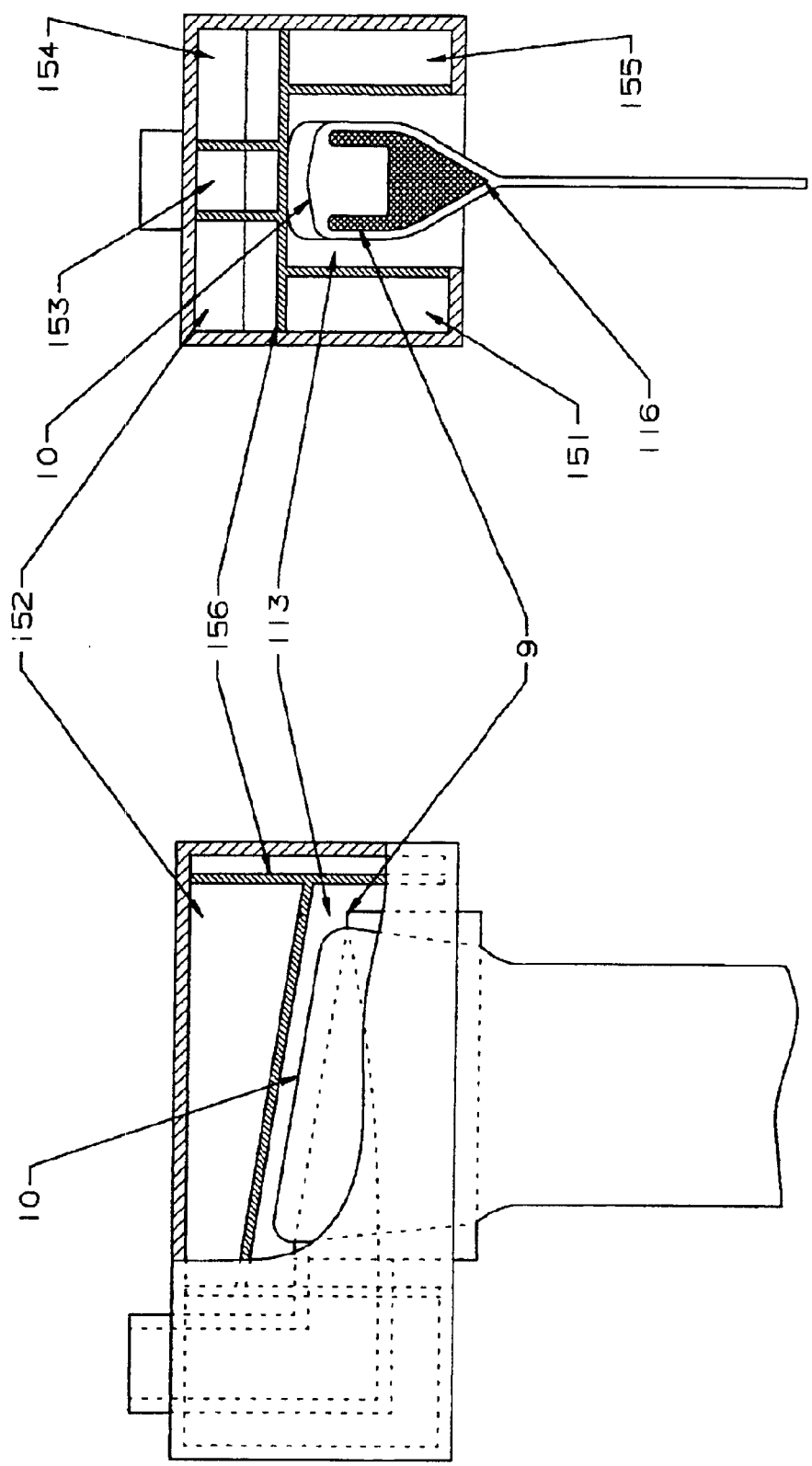
FIG. 15A shows a muffle with multiple heating chambers in a preferred embodiment of the invention.
FIG. 15B shows a section of FIG. 15A.

FIGS. 15A and 15B show an embodiment of this invention whereby the multi-chamber muffle (156) is designed with separate heating chambers (151–155) to control the temperature of the molten glass (10) as its passes through the various individual zones of the forming process. These zones (121–124) are described in FIGS. 12A and 12B. The multi-chamber muffle (156) has five heating chambers (151–155). Heating chamber (153), located over the top of the forming trough (9), effects the flow of glass from the inlet end to the far end of the forming trough (9), (zone (121)). The heating chambers (152) and (154) over the top of the weirs (115) effect the flow over the weirs (115) (zone (122)), and the heating chambers (151) and (155) on each side of the trough (9) are used to balance the temperature longitudinally (zone (123)). All the heating chambers (151–155) have heating elements with adequate power to balance the energy flux to the forming trough (9) and thus create suitable temperature conditions.

Figures 16A, 16B:
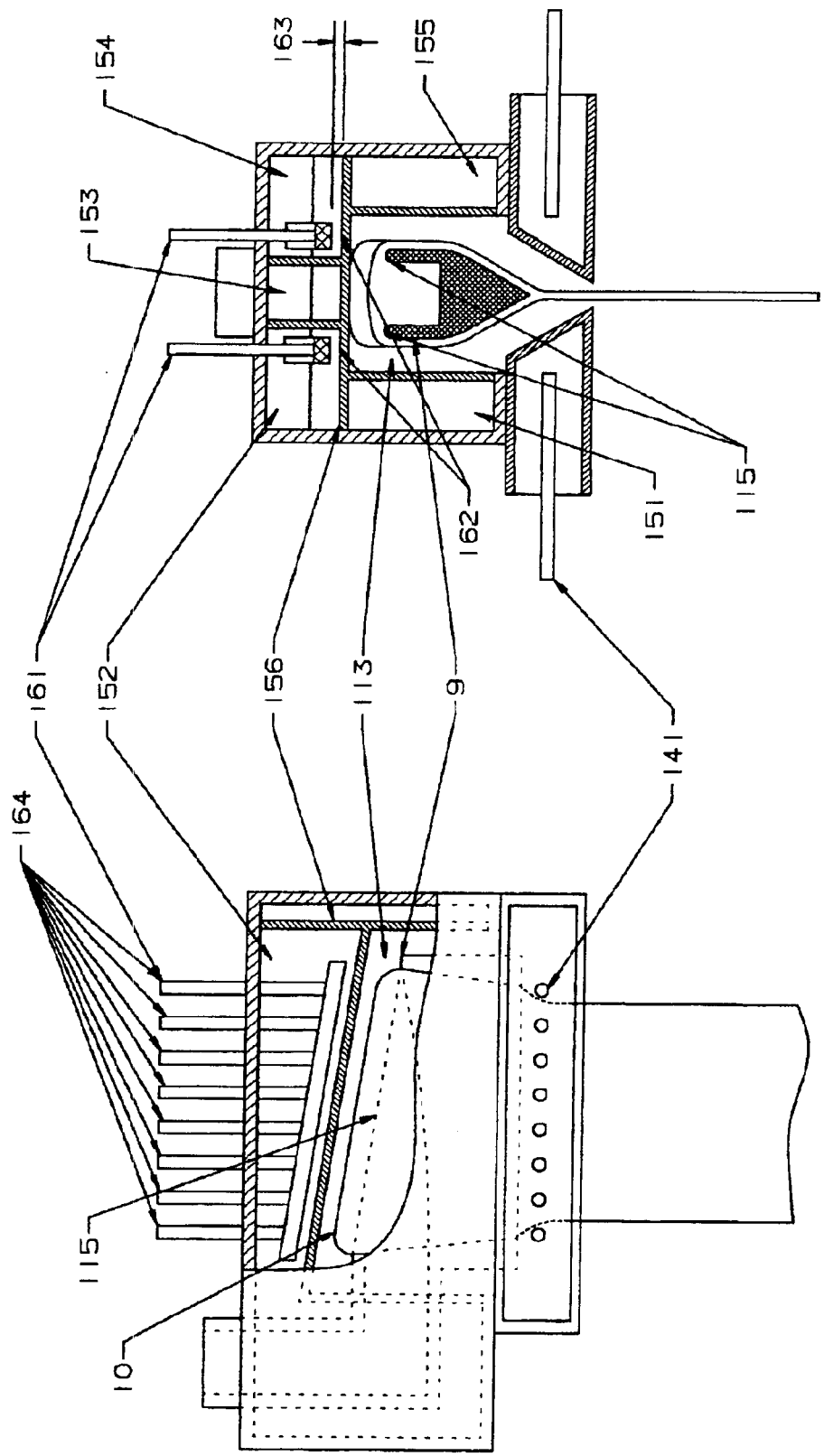
FIG. 16A shows radiant coolers which effect localized cooling to the molten glass as it passes over the weirs in a preferred embodiment of the invention.
FIG. 16B shows a section of FIG. 16A.
Figure 23B:
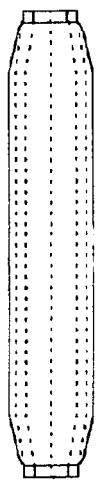
FIG. 23B shows a top view of FIG. 23A.
Figure 23C:
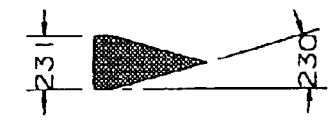
FIG. 23C shows a cross-section of the trough design shown in FIG. 23A across lines C—C.
Figures 23D, 23E:
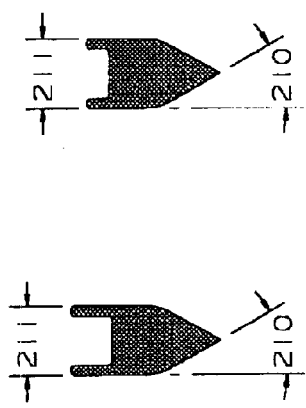
FIG. 23D shows a cross-section of the trough design shown in FIG. 23A across lines D—D.
FIG. 23E shows a cross-section of the trough design shown in FIG. 23A across lines E—E.
Figure 23F:
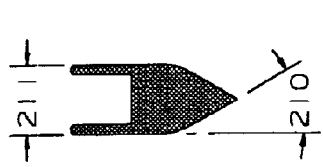
FIG. 23F shows a cross-section of the trough design shown in FIG. 23A across lines F—F.
Figure 23G:
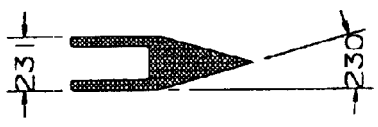
FIG. 23G shows a cross-section of the trough design shown in FIG. 23A across lines G—G.
Figure 23A:
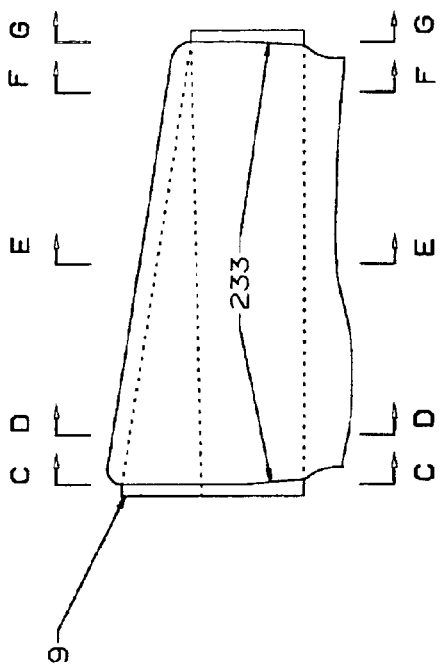
FIG. 23A shows an alternate embodiment of the present invention with further modified ends.

FIGS. 16A and 16B show an embodiment of this invention which affects localized cooling to the molten glass (10) as it passes over the weirs (115). This is zone (122) shown in FIG. 12B. The multi-chamber muffle (156) configuration of FIGS. 15A and 15B is used. Specially designed radiant coolers (161), installed in heating chambers (152) and (154), have the ability to selectively cool the heating chamber side of the muffle surface (162) opposite the weirs (115). The radiant cooler has multiple adjustments (164) such that the temperature of its bottom surface can be varied in the longitudinal direction. The distribution of the heat transfer between the radiant cooler (161) and the muffle surface (162) is a function of the distance (163). By varying the distance (163) between the cooling device (161) and the muffle surface (162), the cooling effect may be attenuated to adjust sensitivity. Although it is not illustrated, the cooling devices (161) are replaceable during operation. The radiant coolers (161) could alternately be inserted from the side instead of the top with a suitable change in the design of the heating chambers (152), (153) and (154).

In an alternative embodiment, the air cooling tubes (142) of FIG. 14A and 14B could be used with the muffle (156) design of FIGS. 15A and 15B, and the radiant coolers (161) of FIGS. 16A and 16B could be used with the muffle (132) configuration of FIGS. 13A and 13B.

Reducing Thickness Variations in the Glass Sheet

Referring to FIGS. 17 through 20, another embodiment of the present invention supports and stresses the forming apparatus in a manner such that the deformation that results from thermal creep has a minimum effect on the thickness variation of the glass sheet. This embodiment introduces a counteracting force to these stresses on the trough in a manner such that the thermal creep which inevitably occurs has a minimum impact on the glass flow characteristics of the forming trough. The invention is designed such that this counteracting force is maintained through an extended period of the production campaign. Thus, sheet glass may be manufactured for a longer time with the same forming trough.

The refractory materials from which the forming trough and its support structure are made have high strength in compression and low strength in tension. Like most structural materials, they also change shape when stressed at high temperature. This embodiment was developed due to the material characteristics and how these characteristics affect the manufacturing process.

There are two fundamental concepts in this embodiment of the invention. First, applying a force and/or moment to the ends of the trough counteracts stress caused by the forces of gravity, thus minimizing the effect on molten glass flow caused by thermal creep. Second, the invention uses compression members shaped such that thermal creep, to which the compression members are also subject, does not substantially alter the application of said force and/or moment.

FIGS. 17A and 17B illustrate the typical effects of thermal creep on the shape of the trough. FIG. 17A shows that the forming trough (9) sags in the middle such that the top of the weirs (115), and the root (116) are now curved (171) and the trough bottom (117) has a change in curvature (171). This curvature (171) causes the molten glass (10) to no longer flow with constant thickness (172) over the weirs (115). This curvature (171) allows more glass to flow over the middle of the weirs resulting in an uneven sheet thickness distribution. FIG. 17B shows how the hydrostatic force (174) from the molten glass (10) in the forming trough (9) forces the weirs (115) to move apart at the top. This allows more glass to flow to the middle of the forming trough (9) making the thickness in the middle even greater.

FIGS. 18A through 18D show a sheet glass forming apparatus (180) as known in the prior art. The forming trough (9) is supported by an inlet end supporting block (181) and a far end supporting block (182). The forming trough (9) is the equivalent of a beam, which is subject to a bending stress from its own weight, from the weight of the glass in and on the trough, and from drawing forces. Because of the low tensile strength of the trough material, a compressive force (183) is applied to the lower half of the forming trough (9) to force the material at the root (116) of the forming trough (9) into compression. Typically the inlet end support block (181) is restrained in the longitudinal (horizontal) direction and the compression force (183) is applied to the far end support block (182). The prior art considers only preventing tension at the root (116) of the forming trough (9), and then only the stress at start-up. Little consideration is made for the effects on stress of the thermal creep of the forming trough (9) and its support blocks (181) and (182).

FIGS. 19A through 19D show an embodiment of a sheet glass forming apparatus (190) that has shaped end support blocks (191) and (192). The inlet end shaped support block (191) is restrained in the longitudinal direction. A compression force (193) is applied to the far end shaped support block (192). The shape of the support block is designed in a manner to produce a force distribution in the forming trough (9) to substantially counteract the effect of the weight of the forming trough (9) and the molten glass (10). The applied force (193) is such that all material in the forming trough (9) is under substantially equal compression stress in the longitudinal direction. This stress causes the thermal creep to occur primarily in the longitudinal direction with little of the sagging shown in FIG. 17A. The forming trough (9) gets shorter due to the equal compressive stress in the longitudinal direction. The shaped support blocks are also subject to thermal creep. The cross section of the shaped support block is the same over substantially its entire length with equal compressive stress across its section. Thus as the shaped support block deforms from thermal creep, it continues to apply substantially the same force distribution to the forming trough (9).

FIGS. 20A through 20D show an embodiment of a sheet glass forming apparatus (200) that has four shaped end support blocks (201), (202), (204), and (205). The inlet end has three shaped support blocks (201), (204), and (205), all of which have longitudinal compression forces (206), (207), and (208) applied. A compression force (203) is applied to the far end shaped support block (202). The shape and loading of the support blocks (202) and (203) are designed to the same criteria as support blocks (191) and (192) in FIGS. 19A–19D. The two upper shaped support blocks (204) and (205) are attached to the inlet end of the weirs and are angled such that they exert an additional force on the weirs to counteract the affect of the hydrostatic forces which tend to spread the weirs apart. Although the blocks (204) and (205) are shown with an inward angle in the figures, they also could be angled outward without deviating from the spirit of the invention.

In a preferred embodiment, short (10–25% of length) transition zones (not shown) are at the trough ends of the shaped support blocks. In these transition zones, the cross-section of the shaped support block will change from that of the shaped support block to a shape that will suitably apply the design load to the trough block.

Effects of Surface Tension on the Sheet

In an alternative embodiment of the invention, the width and the angle of the inverted slope of the forming wedge may be changed to alter the effect of surface tension and body forces on the narrowing of the sheet. In addition, the width and the inverted slope angle may be increased to make the structure stiffer and thus more resistant to thermal creep.

FIGS. 21A through 21G show the prior art shape of the forming trough. The cross-section of the wedge shaped portion, FIGS. 21C through 21G, is uniform over the entire useable length of the trough. The width of the trough (211) and the angle of the inverted slope (210) are identical at each section. As the molten glass (10) flows down the vertical portion (211) of the forming wedge (9), the surface tension and body forces have a minimal effect on the sheet width (212), whereas, when the molten glass (10) flows vertically down the inverted slope portion (210) of the forming wedge, the surface tension and body forces act to make the sheet narrower (213).

FIGS. 22A through 22G show an identical width of the trough (211) over its entire length, whereas the angle of the inverted slope (210) is the same in the center of the trough (FIGS. 21D–21F) and the angle of the inverted slope (220) at each end is reduced. This reduced inverted slope (220) has a counterbalancing effect on the surface tension and body force stresses and thus reduces the narrowing of the sheet (223).

FIGS. 23A through 23G show the width of the trough (211) and the angle of the inverted slope (210) being the same in the center of the trough (FIGS. 21D through 21F and FIGS. 22D through 22F), whereas, the width of the trough (231) and the angle of the inverted slope (230) at each end are reduced. This reduced width (231) and inverted slope (230) have a counterbalancing effect on the surface tension and body force stresses over the effect of FIGS. 22A through 22G and thus further reduces the narrowing of the sheet (233).

FIGS. 24A through 24G show another embodiment of this invention, wherein the width of the trough (211) and (231) and the angle of the inverted slope (210) and (230) are the same as in the embodiment of FIGS. 23A through 23G except that the angle of the inverted slope (240) at the center of the trough, FIG. 24E is substantially greater than the other inverted slopes (210) and (230). This greater angle increases the section modulus of the structure making it stiffer and thus less prone to thermal creep. Keeping the configuration of the ends the same as FIGS. 23A through 23G has substantially the same effect on the surface tension and body force stresses as FIGS. 23A through 23G and thus has little effect on the narrowing of the sheet (243).

Producing a Flat Sheet

U.S. Pat. No. 3,338,696 considers only the glass flow in the forming trough and assumes that the drawn glass from the bottom of the forming trough will be of uniform thickness and flatness because of the uniform thickness of the flow of glass to the critical point of solidification. In practice, glass must be preferentially cooled across its width to create forming stresses during solidification that create a flat sheet. The present invention alters the forming stresses and cooling distribution such that the formed sheet is inherently flat.

FIGS. 25A through 25D show an embodiment of this invention where the shape of the bottom of the forming wedge (116) is not straight but is formed convex upward (250). This causes the glass that is drawn from the center of the forming wedge (251) to cool faster than the glass drawn from each edge (252) of the forming wedge. The strategy is to impose stresses on the partially solidified glass (251) in the center of the sheet to cause the sheet to be flatter, having less warp.

FIGS. 26A through 26D show another embodiment of this invention where the shape of the bottom of the forming wedge (116) is not straight but is formed convex downward (260). This causes the glass that is drawn from the center of the forming wedge (261) to cool slower than that drawn from each edge (262) of the forming wedge. The strategy is to hold the more solidified edges (262) apart, primarily with the edge rollers (110), such that stresses caused by the shrinkage of the partially solidified glass (261) in the center of the sheet cause the sheet to be flatter, having less warp.

FIGS. 27A through 27D show an embodiment of this invention where the shape of the bottom of the forming wedge (116) is not straight but has complex shape across its width (270). This causes the glass that is drawn from the forming wedge (9) to have an equivalent cooling profile. The cooling strategy from this configuration would be a combination of that shown in FIGS. 25A through 25D and 26A through 26D.

Reducing Air Leakage

U.S. Pat. No. 3,338,696 relies primarily on careful design and matching of materials to prevent any material cracks and openings. These cracks and openings are the sources of air leakage, for both initial operation and for operation during the course of a manufacturing campaign. This embodiment of the invention provides individual pressure balancing technology such that even if a leakage path exists at start-up or develops during operation, a minimum quantity of air will flow through the leakage paths.

The glass sheet is formed by drawing the glass from the bottom of the overflow forming trough. The molten glass is cooled and is solidified in a carefully controlled manner. The most desirable cooling phenomena is radiation, which cools the glass substantially evenly through its entire thickness. Convective cooling, which cools only the glass surface, is also a factor. The convective cooling must be minimized as it has a destabilizing effect on the drawing process. The observed phenomena is a cyclic variation in sheet thickness as it is drawn. This is termed "pumping" and is a phenomena noted in all glass drawing processes.

The operating temperature of the forming zone of "The Overflow Process" is typically 1250° C. and is at the top of an open bottom chamber, typically 3 meters high, containing an atmosphere of hot air. Because of the approximately 3 meter column of high temperature air, the atmosphere in the zone where the sheet is formed has a pressure higher than the pressure outside of the forming apparatus. Therefore, any crack or opening creates an airflow path whereby air flows into the open bottom of the chamber, up the chamber and out the cracks or openings. This leakage substantially increases the convective cooling in the forming zone and subsequently produces a cyclic variation in the sheet thickness.

For air to flow through an opening there must be a difference in pressure from one side of the opening to the other. This invention involves adjusting the internal pressure in each of the major components of the forming apparatus such that the pressure difference across any leakage path to the forming zone is essentially zero. Therefore, if an opening either exists or develops, no air leakage will occur as there is no differential pressure to force airflow.

The air pressure in the internal chambers of the forming system is substantially higher than the ambient pressure in the factory. This is because of the low density of the heated air contained in the forming system. This elevated pressure forces the internal air to leak through any openings or cracks in the membranes which separate the forming zones from the heating and cooling zones. The leakage can be minimized by equalizing the air pressure on each side of any leakage path.

Referring now to FIGS. 28A through 32B, FIGS. 28A and 28B show cooling of the glass as it transitions from the molten state to the solid state. This process must be carefully controlled. This cooling process starts on the lower part of the forming apparatus (9) just above the root (116), in the muffle zone (280), continues as the molten glass sheet (11) passes through the muffle door zone (114), and is substantially solidified by the time it leaves the transition zone (281). The controlled cooling process continues in the annealer and pulling machine zone (282) to relieve internal stress in the solidified glass sheet (12).

Four embodiments for controlling forming chamber pressure differentials are shown in FIGS. 29A through 32B. These are a) adding flow to pressurize, b) restricting outflow, c) flowing to a vacuum, and d) encasement by a pressurizing chamber, respectively. Any of these control methods may be used to control the pressure in either the muffle zone (280), the muffle door zone (114), the transition zone (281), or the annealing and pulling machine zone (282) depending on unique design requirements. The critically important objective, however, is to equalize the pressure on each side of the membrane separating either the factory atmosphere or a heating zone or a cooling zone from the forming chamber. This invention also applies to implementations of "The Overflow Process" where the gas in the forming chamber is a gas other than air, i.e. nitrogen, etc.

More specifically, FIGS. 29A and 29B show an embodiment of the muffle zone (280) which shows air (290), which is preferably preheated, introduced into the muffle heating chamber (131) to make the pressure in the heating chamber (131) equal to that in the adjacent forming chamber (113). The wall (132) separating the two chambers in the muffle is normally constructed of many pieces and is therefore susceptible to random leaks. Equalizing the pressure between the two chambers minimizes the leakage flow.

Figures 30A, 30B:
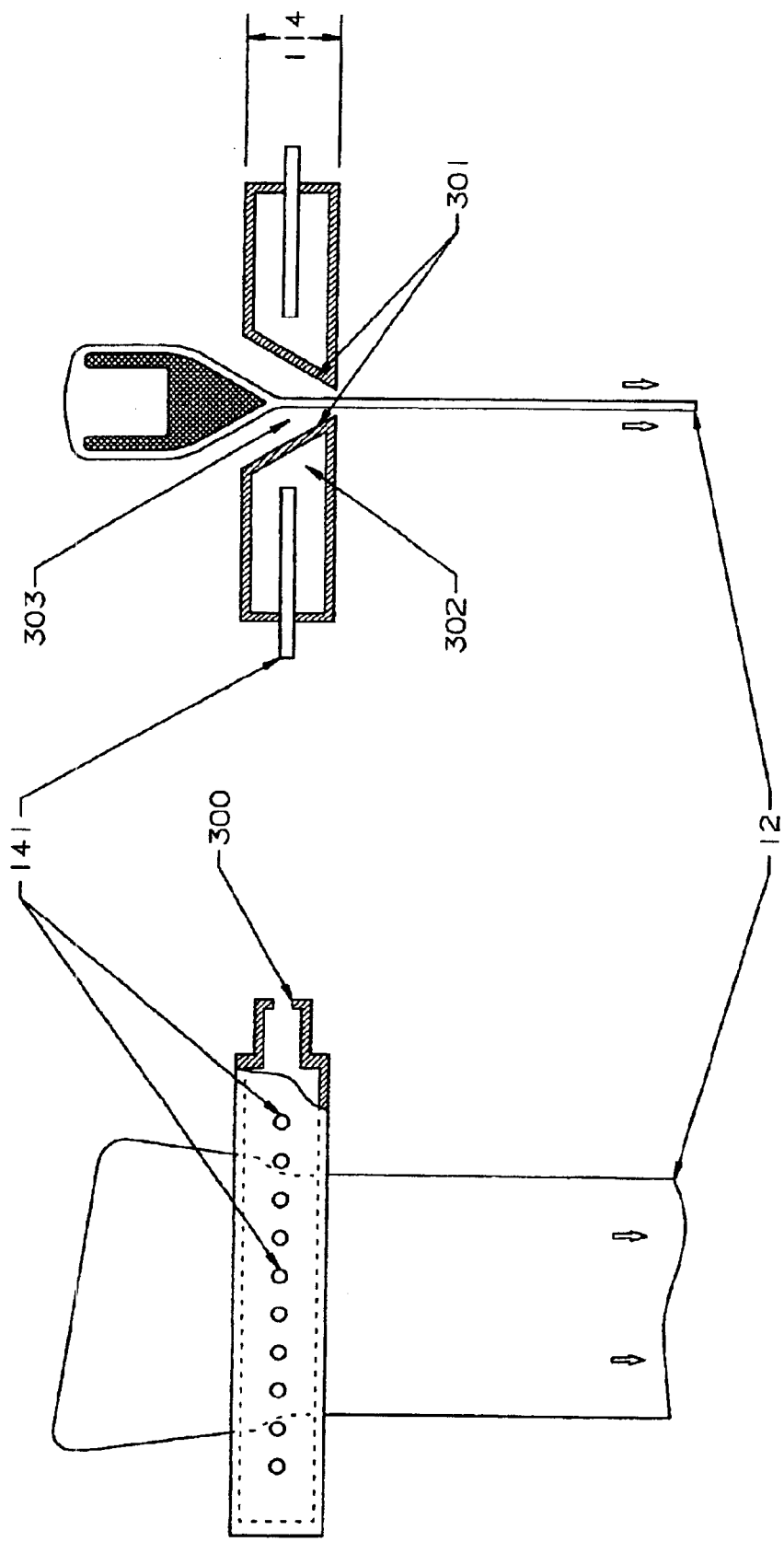
FIG. 30A shows how the pressure in the muffle door zone may be controlled to minimize leakage in a preferred embodiment of the present invention.
FIG. 30B shows a section of FIG. 30A.

FIGS. 30A and 30B show an embodiment of the muffle door zone (114), which includes an exit restriction (300) to the flow of air exiting each muffle door (301) to factory ambient pressure. The size of this restriction is varied to regulate the pressure inside the muffle door (302) equal to that in the pressure in the adjacent forming chamber (303). The flow of air into the muffle doors (301) through the cooling tubes (141) would normally be adequate to overcome any leakage paths and thus raise the muffle door internal pressure (302) to that of the adjacent forming chamber pressure (303).

FIGS. 31A and 31B show an embodiment of the transition zone (281), which has the cooling air at elevated pressure (310) entering the cooling chamber (311) and exiting (312) each of the transition coolers (313) into a regulated vacuum source (314). The large volume of air required for cooling in the transition zone would normally raise the pressure in the transition cooling chamber (311) above that of the adjacent forming chamber (315). A vacuum source (314) is therefore required to lower the pressure and is adjusted to equalize the pressure in the transition cooling chamber (311) to the pressure in the adjacent forming chamber (315).

FIGS. 32A and 32B show an embodiment of the annealer and pulling machine zone (282), which includes a pair of pressure balancing chambers (320) on each end of the annealer and pulling machine (282). The pressure in the balancing chamber (321) is adjusted to be equal to the pressure in the annealing chamber (322). A chamber at each end was chosen because the bearings and adjustment mechanisms for the pulling rollers (111) are on the ends. Alternate configurations would be one single pressure balancing chamber (320) encasing the entire annealer and pulling machine (282) or a multitude of individual pressure balancing chambers (320) as would be required by particular design considerations.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a flow distribution device located under a surface of the glass at an inlet to the trough.

2. The improved apparatus of claim 1, wherein the flow distribution device redistributes a surface flow of the molten glass.

3. The improved apparatus of claim 2, wherein the apparatus reduces a plurality of inhomogeneities in the glass forming the usable portion of the formed sheet.

4. The improved apparatus of claim 1, wherein the improvement further comprises a bowl connected to the inflow pipe at an end opposite the trough via a downcomer pipe, wherein an axis of the bowl is inclined such that a main stream of the molten glass passes through a front of the bowl.

5. The improved apparatus of claim 1, wherein the improvement further comprises a bowl connected to the inflow pipe at an end opposite the trough via a downcomer pipe, wherein the molten glass is fed into the bowl off an axis of a centerline of the trough.

6. The improved apparatus of claim 5, wherein the glass is fed into the bowl at an angle between 30 degrees and 180 degrees with respect to the axis of the centerline of the trough such that the less desirable glass is not on the surface of the sheet.

7. The improved apparatus of claim 6, wherein the glass is fed into the bowl at an angle of approximately 180 degrees such that the less desirable glass proceeds to the far end unusable edge section of the formed glass sheet.

8. The improved apparatus of claim 6, wherein the glass is fed into the bowl at an angle of approximately 45 degrees such that the less desirable glass proceeds to the near end unusable edge section of the formed glass sheet.

9. The improved apparatus of claim 1, wherein the improvement further comprises a downcomer pipe connected to an end of the inflow pipe opposite the trough, wherein a bottom end of the downcomer pipe is located substantially above a glass free surface in the inflow pipe and the downcomer pipe and the inflow pipe have a size and shape which minimizes a zone of quiescent or vortex flow in a path of glass flow.

10. The improved apparatus of claim 1, wherein the improvement further comprises a muffle, wherein the top and sides of the muffle are shaped to an outside surface of the molten glass flowing in and on the trough.

11. The improved apparatus of claim 10, wherein the improvement further comprises at least one heating chamber located adjacent to the muffle on a side opposite the trough.

12. The improved apparatus of claim 11, wherein the improvement further comprises a plurality of air cooling tubes directed at a heating chamber side of the muffle just above the molten glass, wherein the air cooling tubes vary a temperature in a longitudinal direction.

13. The improved apparatus of claim 11, wherein the improvement further comprises a plurality of radiant coolers installed in the heating chamber just above the molten glass, wherein the radiant coolers vary a temperature in a longitudinal direction.

14. The improved apparatus of claim 10, wherein a structure of the muffle creates five heating chambers comprising:
    a) a heating chamber over a top of the trough;
    b) a heating chamber over a left side of the trough sides;
    c) a heating chamber over a right side of the trough sides;
    d) a heating chamber on a left side of the trough; and
    e) a heating chamber on a right side of the trough.

15. The improved apparatus of claim 1, wherein the improvement further comprises:
    a) at least one inlet end support block located at an inlet end of the trough, wherein the inlet end support block supports the trough; and
    b) at least one far end support block located at an opposite end of the trough as the inlet end support block, wherein the far end support block supports the trough;
    wherein the inlet end support block and the far end support block are shaped to distribute force in the trough to counteract the effect of the weight of the trough such that an applied force puts all the refractory that comprises the trough structure under substantially equal compression stress in a longitudinal direction;
    such that any deformation of the forming trough that results from thermal creep has a minimal effect on a thickness variation of the glass sheet.

16. The improved apparatus of claim 15, wherein there are three inlet end support blocks, wherein two of the inlet end support blocks are attached to an inlet end of each of the trough sides and angle to exert an additional force on the trough sides to counteract a plurality of hydrostatic forces which spread the trough sides apart.

17. The improved apparatus of claim 15, wherein the improvement further comprises:
    c) a shape of each support block such that the support block is uniformly stressed in the longitudinal direction;
    wherein the thermal creep of the support block is uniform, thereby maintaining a required force distribution on the trough; and
    d) a transition zone in a support block shape of approximately 10–25% of the length of the support blocks to adapt its shape to that of the trough.

18. The improved apparatus of claim 1, wherein the improvement further comprises a variable cross-section of the apparatus.

19. The improved apparatus of claim 18, wherein an angle of an inverted slope at each end of the trough is less than an angle of an inverted slope at a center of the trough.

20. The improved apparatus of claim 18, wherein a width of the trough at an end of the trough is less than a width of the trough at a center of the trough.

21. The improved apparatus of claim 18, wherein an angle of an inverted sloped at a center of the trough is substantially greater than the angle of the inverted slopes not in the center of the trough.

22. The improved apparatus of claim 1, wherein the improvement further comprises a shape of a bottom of the wedge shaped sheet forming structure selected from the group consisting of:
    a) convex upward;
    b) convex downward; and
    c) a wave comprising both convex downward and convex upward portions;
    such that a sheet formed from the apparatus is flat.

23. The improved apparatus of claim 22, wherein the shape of the bottom of the wedge shaped sheet forming structure affects a thickness distribution of the glass in the edges of the sheet.

24. The improved apparatus of claim 1, wherein an internal pressure between adjacent chambers in the apparatus during a glass cooling process are adjusted such that a pressure difference across an air leakage path to a forming zone is substantially zero, thereby eliminating air leakage.

25. The improved apparatus of claim 24, wherein the chambers comprise:
    a) a muffle zone enclosing the forming trough;
    b) a muffle door zone, located at a bottom of the wedge of the trough;
    c) a transition zone, which transitions the molten glass between the muffle door zone and an annealer and pulling machine zone; and
    d) the annealer and pulling machine zone.

26. The improved apparatus of claim 24 wherein the adjustment is accomplished by adding air flow to one of the adjacent chambers.

27. The improved apparatus of claim 24, wherein the adjustment is accomplished by restricting an outflow of air from one of the adjacent chambers to factory ambient pressure.

28. The improved apparatus of claim 24, further comprising a vacuum source to lower a pressure in one of the adjacent chambers.

29. The improved apparatus of claim 24, further comprising at least one supplementary pressure chamber, wherein the adjustment is accomplished by encasing one chamber in the pressure chamber.

30. The improved apparatus of claim 29, wherein there are at least two supplementary pressure chambers.

31. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a surface flow distribution device located at an inlet to the trough, wherein the flow distribution device redistributes a surface flow of the molten glass.

32. The improved apparatus of claim 31, wherein the apparatus reduces a plurality of inhomogeneities in the glass forming the usable portion of the formed sheet.

33. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a bowl connected to the inflow pipe at an end opposite the trough via a downcomer pipe, wherein an axis of the bowl is inclined such that a main stream of the molten glass passes through a front of the bowl.

34. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a bowl connected to the inflow pipe at an end opposite the trough via a downcomer pipe, wherein the molten glass is fed into the bowl off an axis of a centerline of the trough.

35. The improved apparatus of claim 34, wherein the glass is fed into the bowl at an angle between 30 degrees and 180 degrees with respect to the axis of the centerline of the trough such that the less desirable glass is not on the surface of the sheet.

36. The improved apparatus of claim 35, wherein the glass is fed into the bowl at an angle of approximately 180 degrees such that the less desirable glass proceeds to the far end unusable edge section of the formed glass sheet.

37. The improved apparatus of claim 35, wherein the glass is fed into the bowl at an angle of approximately 45 degrees such that the less desirable glass proceeds to the near end unusable edge section of the formed glass sheet.

38. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a downcomer pipe connected to an end of the inflow pipe opposite the trough, wherein a bottom end of the downcomer pipe is located substantially above a glass free surface in the inflow pipe and the downcomer pipe and the inflow pipe have a size and shape which minimizes a zone of quiescent or vortex flow in a path of glass flow.

39. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises five heating chambers.

40. The improved apparatus of claim 39, wherein the five heating chambers comprise:

a) a heating chamber over a top of the trough;

b) a heating chamber over a left side of the trough sides;

c) a heating chamber over a right side of the trough sides;

d) a heating chamber on a left side of the trough; and e) a heating chamber on a right side of the trough.

41. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a) at least one inlet end support block located at an inlet end of the trough, wherein the inlet end support block supports the trough; and b) at least one far end support block located at an opposite end of the trough as the inlet end support block, wherein the far end support block supports the trough;

wherein the inlet end support block and the far end support block are shaped to distribute force in the trough to counteract the effect of the weight of the trough such that an applied force puts all the refractory that comprises the trough structure under substantially equal compression stress in a longitudinal direction;

such that any deformation of the forming trough that results from thermal creep has a minimal effect on a thickness variation of the glass sheet.

42. The improved apparatus of claim 41, where there are three inlet end support blocks, wherein two of the inlet end support blocks are attached to an inlet end of each of the trough sides and angle to exert an additional force on the trough sides to counteract a plurality of hydrostatic forces which spread the trough sides apart.

43. The improved apparatus of claim 41, wherein the improvement further comprises:

c) a shape of each support block such that the support block is uniformly stressed in the longitudinal direction;

wherein the thermal creep of the support block is uniform, thereby maintaining a required force distribution on the trough; and d) a transition zone in a support block shape of approximately 10–25% of the length of the support blocks to adapt its shape to that of the trough.

44. The improved apparatus of claim 41, wherein the improvement further comprises a variable cross-section of the apparatus.

45. The improved apparatus of claim 44, wherein an angle of an inverted slope at each end of the trough is less than an angle of an inverted slope at a center of the trough.

46. The improved apparatus of claim 44, wherein a width of the trough at an end of the trough is less than a width of the trough at a center of the trough.

47. The improved apparatus of claim 44, wherein an angle of an inverted sloped at a center of the trough is substantially greater than the angle of the inverted slopes not in the center of the trough.

48. The improved apparatus of claim 41, wherein the improvement further comprises a shape of a bottom of the wedge shaped sheet forming structure selected from the group consisting of:

a) convex upward;

b) convex downward; and c) a wave comprising both convex downward and convex upward portions;

such that a sheet formed from the apparatus is flat.

49. The improved apparatus of claim 48, wherein the shape of the bottom of the wedge shaped sheet forming structure affects a thickness distribution of the glass in the edges of the sheet.

50. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises a shape of a bottom of the wedge shaped sheet forming structure selected from the group consisting of:

a) convex downward; and b) a wave comprising both convex downward and convex upward portions;

such that a sheet formed from the apparatus is flat.

51. The improved apparatus of claim 50, wherein the shape of the bottom of the wedge shaped sheet forming structure affects a thickness distribution of the glass in the edges of the sheet.

52. A method for reducing air leakage when forming sheet glass using an apparatus that includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, wherein the method comprises the step of:

a) adjusting an internal pressure between adjacent chambers in the apparatus during a glass cooling process such that a pressure difference across an air leakage path to a forming zone is substantially zero, thereby eliminating air leakage.

53. The method of claim 52, wherein the chambers comprise:

a) a muffle zone enclosing the forming trough;

b) a muffle door zone, located at a bottom of the wedge of the trough;

c) a transition zone, which transitions the molten glass between the muffle door zone and an annealer and pulling machine zone; and d) the annealer and pulling machine zone.

54. The method of claim 52, wherein step (a) is accomplished by adding air flow to one of the adjacent chambers.

55. The method of claim 52, wherein step (a) is accomplished by restricting an outflow of air from one of the adjacent chambers to factory ambient pressure.

56. The method of claim 52, wherein step (a) is accomplished by providing a vacuum source to lower a pressure in one of the adjacent chambers.

57. The method of claim 52, wherein step (a) is accomplished by encasing one chamber in at least one supplementary pressure chamber.

58. The method of claim 52, wherein there are at least two supplementary pressure chambers.

59. The method of claim 52, wherein the apparatus further comprises a flow distribution device located under a surface of the glass.

60. The method of claim 59, wherein the apparatus reduces a plurality of inhomogeneities in the glass forming the usable portion of the formed sheet.

61. The method of claim 52, wherein the apparatus further comprises:

a) an inflow pipe for delivering molten glass to the trough; and b) a surface flow distribution device located at an inlet to the trough, wherein the flow distribution device redistributes a surface flow of the molten glass.

62. The method of claim 52, wherein the apparatus further comprises a bowl connected to the inflow pipe at an end opposite the trough via a downcomer pipe, wherein an axis of the bowl is inclined such that a main stream of the molten glass passes through a front of the bowl.

63. The method of claim 52, wherein the apparatus further comprises a bowl connected to the inflow pipe at an end opposite the trough via a downcomer pipe, wherein the molten glass is fed into the bowl off an axis of a centerline of the bowl.

64. The method of claim 63, wherein the glass is fed into the bowl at an angle between 30 degrees and 180 degrees with respect to the axis of the centerline of the trough such that the less desirable glass is not on the surface of the sheet.

65. The method of claim 64, wherein the glass is fed into the bowl at an angle of approximately 180 degrees such that the less desirable glass proceeds to the far end unusable edge section of the formed glass sheet.

66. The method of claim 64, wherein the glass is fed into the bowl at an angle of approximately 45 degrees such that the less desirable glass proceeds to the near end unusable edge section of the formed glass sheet.

67. The method of claim 52, wherein the apparatus further comprises a downcomer pipe connected to an end of the inflow pipe opposite the trough, wherein a bottom end of the downcomer pipe is located substantially above a glass free surface in the inflow pipe and the downcomer pipe and the inflow pipe have a size and shape which minimizes a zone of quiescent or vortex flow in a path of glass flow.

68. The method of claim 52, wherein the apparatus further comprises a muffle, wherein the top and sides of the muffle are shaped to an outside surface of the molten glass flowing in and on the trough.

69. The method of claim 68, wherein the apparatus further comprises at least one heating chamber, wherein the heating chamber is located adjacent to the muffle on a side opposite the trough.

70. The method of claim 69, wherein the apparatus further comprises a plurality of air cooling tubes directed at a heating chamber side of the muffle just above the molten glass, wherein the air cooling tubes vary a temperature in a longitudinal direction.

71. The method of claim 69, wherein the apparatus further comprises a plurality of radiant coolers installed in the heating chamber just above the molten glass, wherein the radiant coolers vary a temperature in a longitudinal direction.

72. The method of claim 69, wherein a structure of the muffle creates five heating chambers comprising:

a) a heating chamber over a top of the trough;

b) a heating chamber over a left side of the trough sides;

c) a heating chamber over a right side of the trough sides;

d) a heating chamber on a left side of the trough; and e) a heating chamber on a right side of the trough.

73. The method of claim 52, wherein the apparatus further comprises:
  a) at least one inlet end support block located at an inlet end of the trough, wherein the inlet end support block supports the trough; and
  b) at least one far end support block located at an opposite end of the trough as the inlet end support block, wherein the far end support block supports the trough;
  wherein the inlet end support block and the far end support block are shaped to distribute force in the trough to counteract the effect of the weight of the trough such an applied force puts all the refractory that comprises the trough structure under substantially equal compression stress in a longitudinal direction;
  such that any deformation of the forming trough that results from thermal creep has a minimal effect on a thickness variation of the glass sheet.

74. The method of claim 73, wherein there are three inlet end support blocks, wherein two of the inlet end support blocks are attached to an inlet end of each of the trough sides and angle to exert an additional force on the trough sides to counteract a plurality of hydrostatic forces which spread the trough sides apart.

75. The method of claim 73, wherein the apparatus further comprises:
  c) a shape of each support block such that the support block is uniformly stressed in the longitudinal direction;
  wherein the thermal creep of the support block is uniform, thereby maintaining a required force distribution on the trough; and
  d) a transition zone in a support block shape of approximately 10–25% of the length of the support blocks to adapt its shape to that of the trough.

76. The method of claim 52, wherein the apparatus further comprises a variable cross-section of the apparatus.

77. The method of claim 76, wherein an angle of an inverted slope at each end of the trough is less than an angle of an inverted slope at a center of the trough.

78. The method of claim 76, wherein a width of the trough at an end of the trough is less than a width of the trough at a center of the trough.

79. The method of claim 76, wherein an angle of an inverted sloped at a center of the trough is substantially greater than the angle of the inverted slopes not in the center of the trough.

80. The method of claim 52, wherein the apparatus further comprises a shape of a bottom of the wedge shaped sheet forming structure selected from the group consisting of:
  a) convex upward;
  b) convex downward; and
  c) a wave comprising both convex downward and convex upward portions;
  such that a sheet formed from the apparatus is flat.

81. The method of claim 80, wherein the shape of the bottom of the wedge shaped sheet forming structure affects a thickness distribution of the glass in the edges of the sheet.

* * * * *